United States Patent
Taniguchi et al.

(10) Patent No.: US 7,136,347 B2
(45) Date of Patent: Nov. 14, 2006

(54) CONTROL INFORMATION RECORDING METHOD AND APPARATUS, INFORMATION RECORDING METHOD AND APPARATUS, AND INFORMATION RECORD MEDIUM

(75) Inventors: Shoji Taniguchi, Tokorozawa (JP); Akiyoshi Inoue, Tokorozawa (JP); Kazuo Kuroda, Tokorozawa (JP); Toshio Suzuki, Tokorozawa (JP); Hiroyuki Ohira, Nakakoma-gun (JP)

(73) Assignees: Pioneer Electronic Corporation, Tokyo-to (JP); Pioneer Display Products Corporation, Shizuoka-ken (JP)

( * ) Notice: Subject to any disclaimer, the term of this patent is extended or adjusted under 35 U.S.C. 154(b) by 0 days.

(21) Appl. No.: 10/803,442

(22) Filed: Mar. 18, 2004

(65) Prior Publication Data

US 2004/0174794 A1   Sep. 9, 2004

Related U.S. Application Data

(60) Continuation of application No. 10/178,649, filed on Jun. 24, 2002, now Pat. No. 6,731,575, which is a division of application No. 09/218,681, filed on Dec. 22, 1998, now abandoned, which is a division of application No. 08/780,288, filed on Jan. 8, 1997, now Pat. No. 5,901,123.

(30) Foreign Application Priority Data

Jan. 12, 1996   (JP)   ..................... P8-4421

(51) Int. Cl.
*G11B 7/00*   (2006.01)
(52) U.S. Cl. .................. 369/275.3; 369/47.27
(58) Field of Classification Search ............ 369/275.3, 369/275.4, 47.1, 44.26, 47.27, 47.28
See application file for complete search history.

(56) References Cited

U.S. PATENT DOCUMENTS 3,916,440 A   10/1975   Irwin ........................ 360/50
6,058,099 A *   5/2000   Senshu ................... 369/275.3

FOREIGN PATENT DOCUMENTS

EP   0 480 574   4/1992

\* cited by examiner

*Primary Examiner*—Nabil Hindi
(74) *Attorney, Agent, or Firm*—Pitney Hardin LLP

(57) ABSTRACT

By the control information recording method, control information to control at least one of recording and reproducing operations of record information on an information record medium is recorded onto a guide track of the information record medium. The control information recording method is provided with the steps of: generating a control information timing signal one after another at an interval corresponding to a length of a control information unit equal to an N (N: predetermined integer not less than 2) multiple of a length of a record information unit of the record information; and recording the control information onto the guide track of the information record medium, on the basis of a timing corresponding to the control information timing signal.

15 Claims, 13 Drawing Sheets

PRE-PIT SHAPE
(SECTION OF LAND-GROOVE PORTION)

BEAM MOVING DIRECTION

CONTROL INFORMATION RECORDING METHOD AND APPARATUS, INFORMATION RECORDING METHOD AND APPARATUS, AND INFORMATION RECORD MEDIUM

This application is a continuation of U.S. patent application Ser. No. 10/178,649, filed on Jun. 24, 2002, now U.S. Pat. No. 6,731, 575, which is a division of U.S. patent application Ser. No. 09/218,681 filed on Dec. 22, 1998, now abandoned, which is a division of U.S. patent application Ser. No. 08/780,288 filed on Jan. 8, 1997, which issued as U.S. Pat. No. 5,901,123 on May 4, 1999.

BACKGROUND OF THE INVENTION

1. Field of the Invention

The present invention is related with a control information recording method and apparatus for recording in advance, onto an information record medium of WO (Write Once) type (hereafter, referred to as a DVD-R (Digital Video or Versatile Disk-Recordable)) among information record media whose recording densities are dramatically improved over conventional CDs (Compact Disks) and the like represented by the DVD, control information such as address information, a synchronization information etc. (hereafter, referred to as "pre-information") required to record and reproduce the substantial record information such as video information and audio information to and from the DVD-R. The present invention is also related with an information recording method and apparatus for recording the record information onto the DVD-R while reproducing the pre-information from the DVD-R on which the pre-information has been already recorded.

2. Description of the Related Art

In an information record medium such as a WO type postscript optical disk and the like, the pre-information for a position retrieval at a time of writing the record information is recorded in advance onto the information record medium at a pre-format stage in manufacturing the information record medium. As a method of pre-formatting this pre-information, an information record track (a groove track or a land track) for recording the record information is wobbled in a form of a wave so as to record the pre-information. Alternatively, a pre-pit is formed on a portion different from a portion where the record information is recorded on the information record track, so as to record the pre-information.

However, in a case of the pre-format of the pre-information by the wobbling, the information record track itself is swung to the right and left relative to a rotation direction of the information record medium on the basis of a wobbling signal. This results in a problem that a C/N ratio (Carrier to Noise ratio) is poor because of a restriction in a modulation degree of the wobbling signal (wobbling amplitude) due to a relation to an adjacent information record track. Further, considering an interference resulting from the adjacent information record track since the adjacent information record tracks are close to each other by the wobbling, it is difficult to make a track pitch narrow. This results in a problem of limitation in improvement of the recording density.

On the other hand, in a case of the pre-format of the pre-information by the pre-pit, since the pre-pit is formed on the information record track, the recordable amount of the substantial record information is reduced by the amount of the formed pre-pit. This results in a problem of a poor utilization efficiency of a disk record surface.

SUMMARY OF THE INVENTION

Then, the present invention is proposed from the viewpoint of the above mentioned problems. It is therefore an object of the present invention to provide a method of and an apparatus for recording control information (i.e. pre-information) to an information record medium, a method of and an apparatus for recording record information to the information record medium to which the control information is recorded in advance, and the information record medium to which the control information is recorded in advance, which can improve a recording density of the record information and an accuracy in the reproduction of the record information.

The above object of the present invention can be achieved by a first method of recording, onto a guide track of an information record medium, control information to control at least one of recording and reproducing operations of record information on the information record medium. The first method is provided with the steps of: generating a control information timing signal one after another at an interval corresponding to a length of a control information unit equal to an N (N: predetermined integer not less than 2) multiple of a length of a record information unit of the record information; and recording the control information onto the guide track of the information record medium, on the basis of a timing corresponding to the control information timing signal.

According to the first method of the present invention, the control information timing signal is generated one after another at the interval corresponding to the length of the control information unit equal to the N multiple of the length of the record information unit. Then, the control information is recorded onto the guide track of the information record medium, on the basis of the timing corresponding to the control information timing signal. Thus, as compared with a case that the control information is recorded for all of the record information unit, the amount of the control information recorded on the whole information record medium can be reduced by the factor of 1/N, and that the recording density of the record information can be certainly improved. Further, it is possible to easily form a recording layer with a desirable thickness on the information record medium to which the control information has been recorded in advance.

In one aspect of the first method, the control information is pre-information including at least address information indicative of a record position on the information record medium of the record information, the record information unit is one synchronization frame, and in the generating step, the control information timing signal is generated by doubling said one synchronization frame.

According to this aspect of the first method, since the control information timing signal is generated by doubling said one synchronization frame, the pre-information is recorded once per two synchronization frames. Thus, as compared with a case that the pre-information is recorded for all of the synchronization frames, the amount of the pre-information recorded on the whole information record medium can be reduced by half, and that the recording density of the record information can be certainly improved. Further, it is possible to easily form a recording layer with a desirable thickness on the information record medium to which the pre-information has been recorded in advance.

In another aspect of the first method, the control information has a length along the guide track equal to an integer multiple of a unit length corresponding to a pit interval along the guide track defined by a recording format of the record information, for a record pit to be formed on the information record medium in correspondence with the record information in the recording operation, and in the recording step, the control information is recorded for each control information unit, by a control information pit having a length shorter along the guide track than the shortest pit length of the record pit.

According to this aspect of the first method, since the control information is recorded for each control information unit, by the control information pit having the length shorter than the shortest pit length of the record pit, the control information is recorded to have a pit length different from any pit length of the record information. Thus, it is possible to easily separate the record information and the control information from each other in the reproducing operation.

In another aspect of the first method, in the generating step, the control information timing signal is generated at such an interval that positions of the control information recorded on adjacent turns of the guide track are not on a straight line perpendicular to the guide track on the information record medium.

According to this aspect of the first method, since the control information timing signal is generated at such an interval that positions of the control information recorded on adjacent turns of the guide track are not on the straight line perpendicular to the guide track on the information record medium, it is possible to prevent the control information on the adjacent turns of the guide track from interfering or leaking to each other in the recording or reproducing operation.

In another aspect of the first method, the generating step is provided with the steps of: generating an even timing signal, as a first kind of the control information timing signal corresponding to an even numbered record information unit in a record information unit row comprising M (M: predetermined integer not less than 2) record information units; generating an odd timing signal, as a second kind of the control information timing signal corresponding to an odd numbered record information unit in the record information unit row; and selecting one of the even and odd timing signals such that positions of the control information recorded on adjacent turns of the guide track are not on a straight line perpendicular to the guide track on the information record medium. In the recording step, the control information is recorded onto the guide track of the information record medium, on the basis of a timing corresponding to the selected one of the even and odd timing signals.

According to this aspect of the first method, in the generating step, the even timing signal corresponding to the even numbered record information unit in the record information unit row is generated, while the odd timing signal corresponding to the odd numbered record information unit in the record information unit row is generated. At this time, one of the even and odd timing signals is selected such that positions of the control information recorded on adjacent turns of the guide track are not on the straight line perpendicular to the guide track on the information record medium. Then, in the recording step, the control information is recorded onto the guide track of the information record medium, on the basis of the timing corresponding to the selected one of the even and odd timing signals. Thus, since the control information is recorded only in the even or odd numbered record information unit, as compared with a case that the control information is recorded for all of the record information unit, the amount of the control information recorded on the whole information record medium can be reduced by about half, and that the recording density of the record information can be certainly improved. Further, it is possible to easily form a recording layer with a desirable thickness on the information record medium to which the control information has been recorded in advance. Furthermore, it is possible to prevent the control information on the adjacent turns of the guide track from interfering or leaking to each other in the recording or reproducing operation.

In this aspect of the first method, the selecting step may be preferably provided with the steps of: storing the selected one of the even and odd timing signals for one turn of the guide track; and selecting one of the even and odd timing signals for another turn of the guide track next to said one turn, on the basis of the stored one of the even and odd timing signals.

In this case, at first, the selected one of the even and odd timing signals is stored for one turn of the guide track. Later, one of the even and odd timing signals is newly selected for another turn of the guide track next to said one turn, on the basis of the stored one of the even and odd timing signals. Thus, it is possible, by use of a relatively simple construction, to select one of the even and odd timing signals such that positions of the control information recorded on adjacent turns of the guide track are not on the straight line perpendicular to the guide track on the information record medium.

The above object of the present invention can be also achieved by a first apparatus for recording, onto a guide track of an information record medium, control information to control at least one of recording and reproducing operations of record information on the information record medium. The first apparatus is provided with: a generating unit for generating a control information timing signal one after another at an interval corresponding to a length of a control information unit equal to an N (N: predetermined integer not less than 2) multiple of a length of a record information unit of the record information; and a recording unit for recording the control information onto the guide track of the information record medium, on the basis of a timing corresponding to the control information timing signal.

According to the first apparatus of the present invention, the control information timing signal is generated, by the generating unit, one after another at the interval corresponding to the length of the control information unit equal to the N multiple of the length of the record information unit. Then, the control information is recorded, by the recording unit, onto the guide track of the information record medium, on the basis of the timing corresponding to the control information timing signal. Thus, in the same manner as the above described first method of the present invention, the amount of the control information can be reduced, and that the recording density of the record information can be improved. Further, it is possible to easily form the recording layer with the desirable thickness.

In one aspect of the first apparatus, the control information is pre-information including at least address information indicative of a record position on the information record medium of the record information, the record information unit is one synchronization frame, and the generating unit generates the control information timing signal by doubling said one synchronization frame.

According to this aspect of the first apparatus, in the same manner as the first method of the present invention, the amount of the pre-information can be reduced, and that the recording density can be improved. Further, it is possible to easily form the recording layer with the desirable thickness.

In another aspect of the first apparatus, the control information has a length along the guide track equal to an integer multiple of a unit length corresponding to a pit interval along the guide track defined by a recording format of the record information, for a record pit to be formed on the information record medium in correspondence with the record information in the recording operation, and the recording unit records the control information for each control information unit, by a control information pit having a length shorter along the guide track than the shortest pit length of the record pit.

According to this aspect of the first apparatus, in the same manner as the first method of the present invention, it is possible to easily separate the record information and the control information from each other in the reproducing operation.

In another aspect of the first apparatus, the generating unit generates the control information timing signal at such an interval that positions of the control information recorded on adjacent turns of the guide track are not on a straight line perpendicular to the guide track on the information record medium.

According to this aspect of the first apparatus, in the same manner as the first method of the present invention, it is possible to prevent the control information on the adjacent turns of the guide track from interfering or leaking to each other in the recording or reproducing operation.

In another aspect of the first apparatus, the generating unit is provided with: a first generating device for generating an even timing signal, as a first kind of the control information timing signal corresponding to an even numbered record information unit in a record information unit row comprising M (M: predetermined integer not less than 2) record information units; a second generating device for generating an odd timing signal, as a second kind of the control information timing signal corresponding to an odd numbered record information unit in the record information unit row; and a selecting device for selecting one of the even and odd timing signals such that positions of the control information recorded on adjacent turns of the guide track are not on a straight line perpendicular to the guide track on the information record medium. The recording unit records the control information onto the guide track of the information record medium, on the basis of a timing corresponding to the selected one of the even and odd timing signals.

According to this aspect of the first apparatus, in the same manner as the first method of the present invention, the amount of the control information can be reduced by about half, and that the recording density can be certainly improved. Further, it is possible to easily form the recording layer with the desirable thickness. Furthermore, it is possible to prevent the control information on the adjacent turns of the guide track from interfering or leaking to each other in the recording or reproducing operation.

In this aspect of the first apparatus, the selecting device may be preferably provided with: a memory for storing the selected one of the even and odd timing signals for one turn of the guide track; and a selector for selecting one of the even and odd timing signals for another turn of the guide track next to said one turn, on the basis of the stored one of the even and odd timing signals.

In this case, in the same manner as the first method of the present invention, it is possible, by use of a relatively simple construction, to select one of the even and odd timing signals such that positions of the control information recorded on adjacent turns of the guide track are not on the straight line perpendicular to the guide track on the information record medium.

The above object of the present invention can be also achieved by an information record medium provided with: a substrate having an information record surface; an information record track formed on the information record surface in a spiral or coaxial shape, for recording record information; a guide track formed on the information record surface in parallel to the information record track, for guiding a light beam, which is to perform at least one of recording and reproducing operations of the record information, to the information record track; and a control information for controlling at least one of the recording and reproducing operations, recorded on the guide track at an interval corresponding to a length of a control information unit equal to an N (N: predetermined integer not less than 2) multiple of a length of a record information unit of the record information.

According to the information record medium of the present invention, as compared with an information record medium in which the control information is recorded for all of the record information unit, the amount of the control information recorded on the whole information record medium can be reduced by the factor of 1/N, and that the recording density of the record information can be certainly improved. Further, it is possible to easily form a recording layer with a desirable thickness on the information record medium to which the control information has been recorded in advance.

In one aspect of the information record medium, the control information is pre-information including at least address information indicative of a record position on the information record surface of the record information, the record information unit is one synchronization frame, and the pre-information is recorded on the guide track for each pre-information unit, which is obtained by doubling said one synchronization frame.

According to this aspect of the information record medium, as compared with an information record medium in which the pre-information is recorded for all of the synchronization frames, the amount of the pre-information recorded on the whole information record medium can be reduced by half, and that the recording density of the record information can be certainly improved. Further, it is possible to easily form a recording layer with a desirable thickness on the information record medium to which the pre-information has been recorded in advance.

In another aspect of the information record medium, the control information has a length along the guide track equal to an integer multiple of a unit length corresponding to a pit interval along the guide track defined by a recording format of the record information, for a record pit to be formed on the information record surface in correspondence with the record information in the recording operation, and the control information is recorded for each control information unit, by a control information pit having a length shorter along the guide track than the shortest pit length of the record pit.

According to this aspect of the information record medium, it is possible to easily separate the record information and the control information from each other in the reproducing operation.

In another aspect of the information record medium, positions of the control information recorded on adjacent turns of the guide track are not on a straight line perpendicular to the guide track on the information record surface.

According to this aspect of the information record medium, it is possible to prevent the control information on the adjacent turns of the guide track from interfering or leaking to each other in the recording or reproducing operation.

In another aspect of the information record medium, the information record medium is further provided with the record information, which is recorded on the information record track by a record pit formed in correspondence with the record information in the recording operation and which has a synchronization signal for achieving a synchronization in the reproducing operation, wherein the control information has a length along the guide track equal to an integer multiple of a unit length corresponding to a pit interval along the guide track defined by a recording format of the record information, the control information is recorded for each control information unit, by a control information pit having a length shorter along the guide track than the shortest pit length of the record pit, and positions of the control information and the synchronization signal recorded on adjacent turns of the guide track and the information record track are on a straight line perpendicular to the guide track on the information record surface.

According to this aspect of the information record medium, since the control information is recorded to have a pit length different from any pit length of the record information, it is possible to easily separate the record information and the control information from each other in the reproducing operation. Further, the positions of the control information and the synchronization signal recorded on adjacent turns of the guide track and the information record track are on the straight line perpendicular to the guide track, it is possible to easily obtain the timing relationship between the record information and the control information, and easily separate them from each other in the reproducing operation.

The above object of the present invention can be also achieved by a second method of recording record information onto the above described information record medium of the present invention. The second method is provided with the steps of: detecting the control information from the information record medium; generating the record information on the basis of a record signal inputted from the external such that a synchronization signal is added to each record information unit in correspondence with the detected control information; and recording the generated record information onto the information record track.

According to the second method of the present invention, in advance of actually recording the record information, the control information is firstly detected from the information record medium. Secondly, the record information is generated on the basis of a record signal inputted from the external such that the synchronization signal is added to each record information unit in correspondence with the detected control information. Finally, the generated record information is recorded onto the information record track. Thus, on the information record medium which has been recorded by the second method, the position of the synchronization signal on the information record track and the position of the control information on the guide track are adjacent to each other, so that it is possible to easily separate the record information and the control information from each other in the detection of the control signal and the reproduction of the record information.

The above object of the present invention can be also achieved by a second apparatus for recording record information onto the above described information record medium of the present invention. The second apparatus is provided with: a detecting unit for detecting the control information from the information record medium; a record information generating unit for generating the record information on the basis of a record signal inputted from the external such that a synchronization signal is added to each record information unit in correspondence with the detected control information; and a recording unit for recording the generated record information onto the information record track.

According to the second apparatus of the present invention, in advance of actually recording the record information, the control information is firstly detected, by the detecting unit, from the information record medium. Secondly, the record information is generated, by the record information generating unit, on the basis of a record signal inputted from the external such that the synchronization signal is added to each record information unit in correspondence with the detected control information. Finally, the generated record information is recorded, by the recording unit, onto the information record track. Thus, in the same manner as the second method of the present invention, it is possible to easily separate the record information and the control information from each other in the detection of the control signal and the reproduction of the record information.

As described above, according to the present invention, it is possible to prevent a direct current (DC) element from being changed in the detected or reproduced signal of the information record medium, and also possible to protect the jitter due to the unstableness of the pit shape from being generated in the detected or reproduced signal, so that the detection of the control information and the reproduction of the record information can be accurately performed while the recording density of the record information can be certainly improved.

The nature, utility, and further features of this invention will be more clearly apparent from the following detailed description with respect to a preferred embodiment of the invention when read in conjunction with the accompanying drawings briefly described below.

DETAILED DESCRIPTION OF THE PREFERRED EMBODIMENTS

Preferred embodiments of the present invention are explained with reference to the drawings.

(I) Embodiment of Control Information Recording Apparatus

At first, an embodiment of a cutting machine for forming a pre-pit corresponding to pre-information, as one example of a control information recording apparatus, will be explained with reference to FIGS. 1 to 8. An embodiment of the DVD-R, as an information record medium, in which the pre-pit is formed by the cutting machine is also described in the following explanation of the embodiment of the cutting machine.

At first, a structure of the DVD-R in which the pre-pit is formed by the cutting machine of this embodiment described later is explained with reference to FIG. 1.

Figure 1:
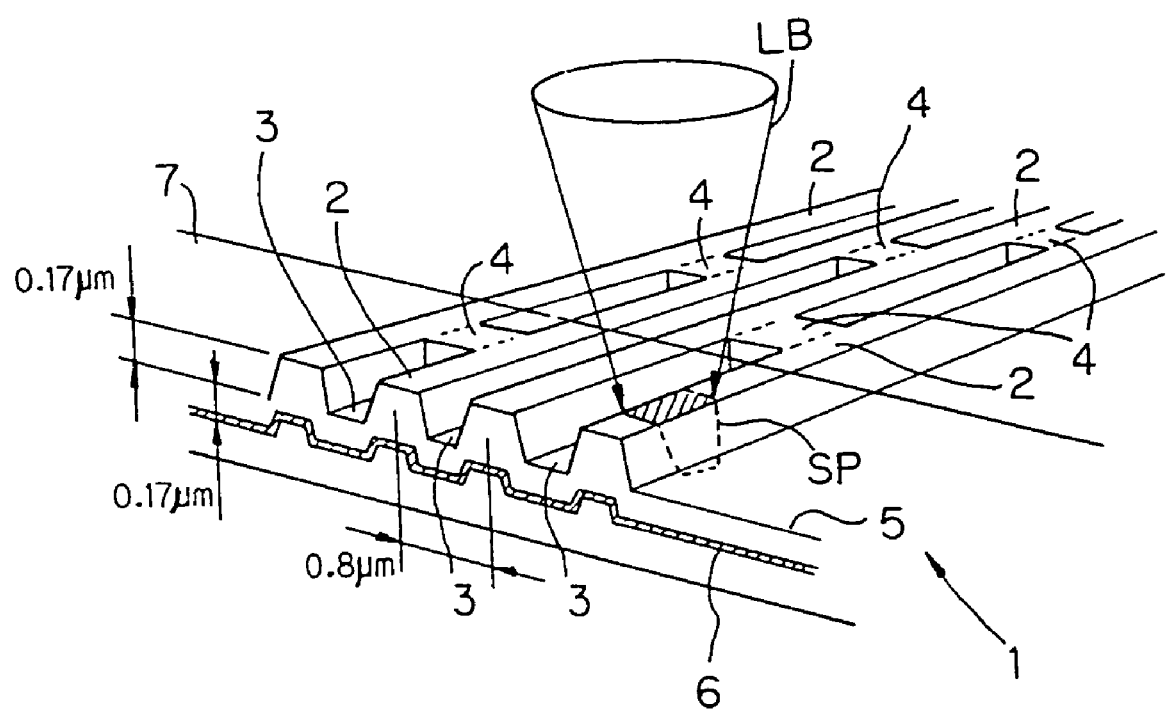
FIG. 1 is a schematic appearance view showing an example of the DVD-R in which a pre-pit is formed on a land track.

In FIG. 1, a DVD-R 1 is a pigment type DVD-R, which has a pigment film 5 and to which information can be written only one time. A groove track 2 as an information record track and a land track 3 as a guide track for guiding a light beam LB, such as a laser beam and the like as a reproduction light or a record light, to the groove track 2 are formed in the DVD-R 1 by the cutting machine described later. The DVD-R 1 is also provided with a protection layer 7 for protecting them and a gold deposition film 6 for reflecting the light beam LB at a time of reproducing the recorded information. The pre-pit 4 corresponding to the pre-information is formed on this land track 3 by the cutting machine described later. This pre-pit 4 is formed in advance before the DVD-R 1 is shipped. It is noted here that the "land" track and the "groove" track are defined relative to each other as shown in FIG. 1, and the track of either one type may be defined as the land track while the track of the other type is defined as the groove track.

When recording the record information (i.e. the substantial record information, such as the video information, the audio information and the like, to be inherently recorded other than the pre-information), the pre-information is obtained, in advance of actually recording the record information, by detecting this pre-pit 4 by an information recording apparatus described later. Based on it, an optimum output of the light beam LB as the record light and other recording parameters are set. Further, address information and the like indicative of a position on the DVD-R 1, at which each record information is to be recorded, are obtained. The record information is recorded on the corresponding record position on the basis of this address information.

When recording the record information, the light beam 113 is irradiated such that a center thereof coincides with a center of the groove track 2. Then, a record information pit corresponding to the record information is formed on the groove track 2, and accordingly the record information is recorded. At this time, a size of a light spot SP is set such that it is irradiated to not only the groove track 2 but also the land track 3, as shown in FIG. 1. The pre-information is obtained by detecting the pre-pit 4 by means of a tangential push-pull method described later, by using a portion of reflection light of the light spot SP partially irradiated to the land track 3.

Next, a recording format of the pre-information recorded by the cutting machine of the embodiment is explained with reference to FIG. 2, before actually explaining the cutting machine of the embodiment.

Figure 2:
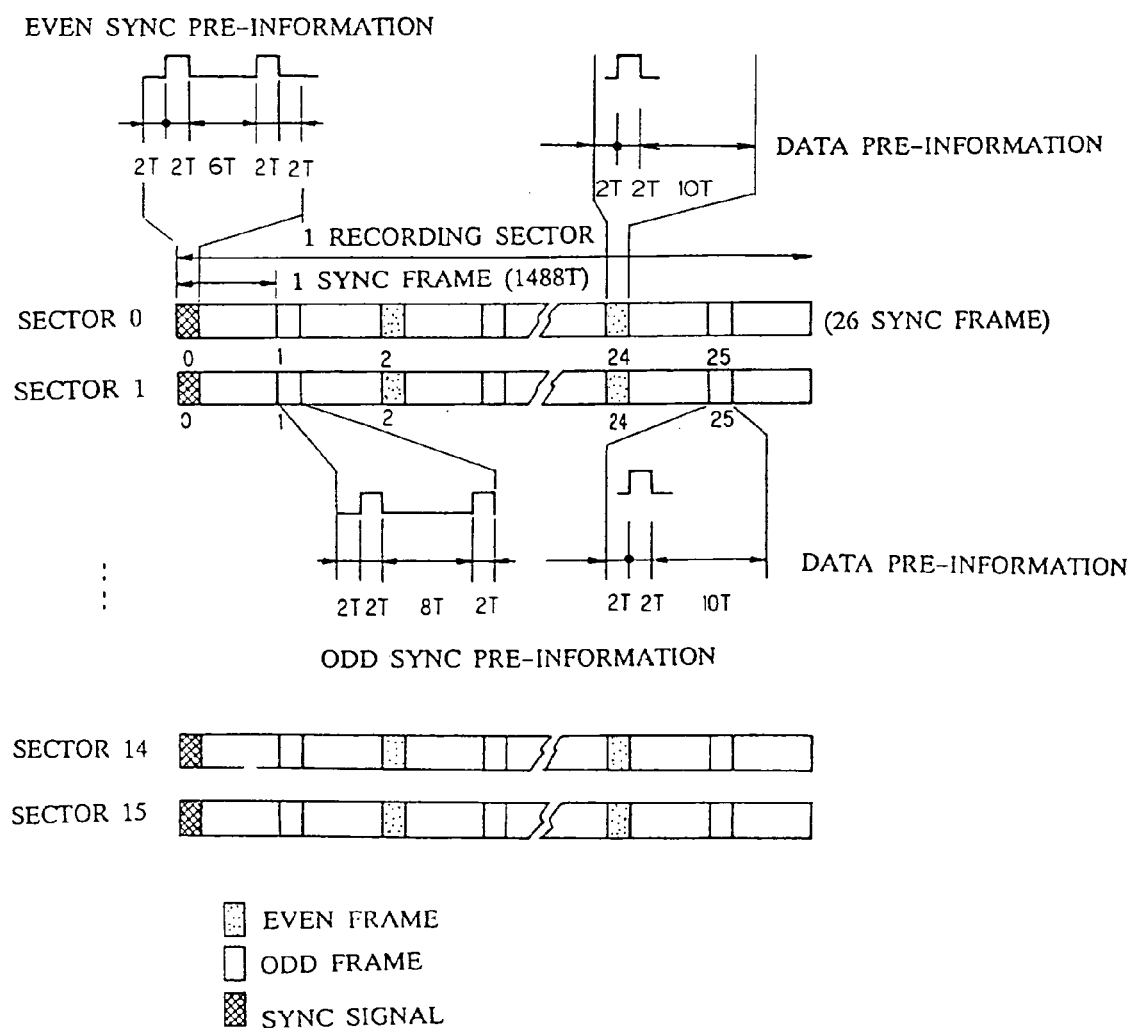
FIG. 2 is a diagram showing a recording format of the pre-information and the record information.

As shown in FIG. 2, the pre-information of the embodiment is recorded for each synchronization frame (SYNC frame) as an information unit. Further, one recording sector as an information unit row is formed by 26 synchronization frames. Further, one ECC (Error Correcting Code) block is formed by 16 recording sectors. One synchronization frame has a length equal to 1488 times (1488T) of the unit length (hereafter, referred to as "T") corresponding to a pit interval defined by the recording format at a time of recording the record information.

The pre-information is recorded at a top portion with a length of 14T in each of the synchronization frames. In the present embodiment, the pre-information is recorded only on the synchronization frames having even numbers (hereafter, referred to as EVEN frames) or the synchronization frames having odd numbers (hereafter, referred to as ODD frames), in one recording sector. The recorded pre-information is classified into synchronization pre-information and data pre-information. Among them, the synchronization pre-information is recorded as a top pre-information in each of the recording sectors (i.e., the 0th frame for the EVEN SYNC, and the 1st frame for the ODD SYNC). The synchronization pre-information recorded on the EVEN frame (EVEN SYNC pre-information) and the synchronization pre-information recorded on the ODD frame (ODD SYNC pre-information) are recorded by different patterns, as shown in FIG. 2. It is possible to read out these patterns at a time of recording the later described record information to thereby judge whether the pre-information is recorded on the EVEN frame or the ODD frame.

On the other hand, the data pre-information is dissipated into a plurality of synchronization frames and recorded thereon. In one synchronization frame, the data pre-information corresponding to [1] is recorded by a length of 2T (i.e., the unit of the pre-information is 2T), as shown in FIG. 2.

In FIG. 2, in the recording sector 0, the pre-information is recorded on the EVEN frame (EVEN SYNC pre-information). In the recording sector 1, the pre-information is recorded on the ODD frame (ODD SYNC pre-information).

Further, the record information, which is recorded on the basis of the pre-information detected by the information recording apparatus described later, has the format similar to the recording format shown in FIG. 2. At this time, in the record information, the substantial record data, such as the video information, the audio information and the like, are recorded on positions other than the top portion with 14T, in one synchronization frame. In the pre-information, no information is recorded on the positions other than the top portion with 14T, in one synchronization frame.

Next, the cutting machine in accordance with the embodiment for forming, as shown in FIG. 1, the pre-pit 4 having the recording format shown in FIG. 2 is explained with reference to FIGS. 3 to 8.

Figure 4:
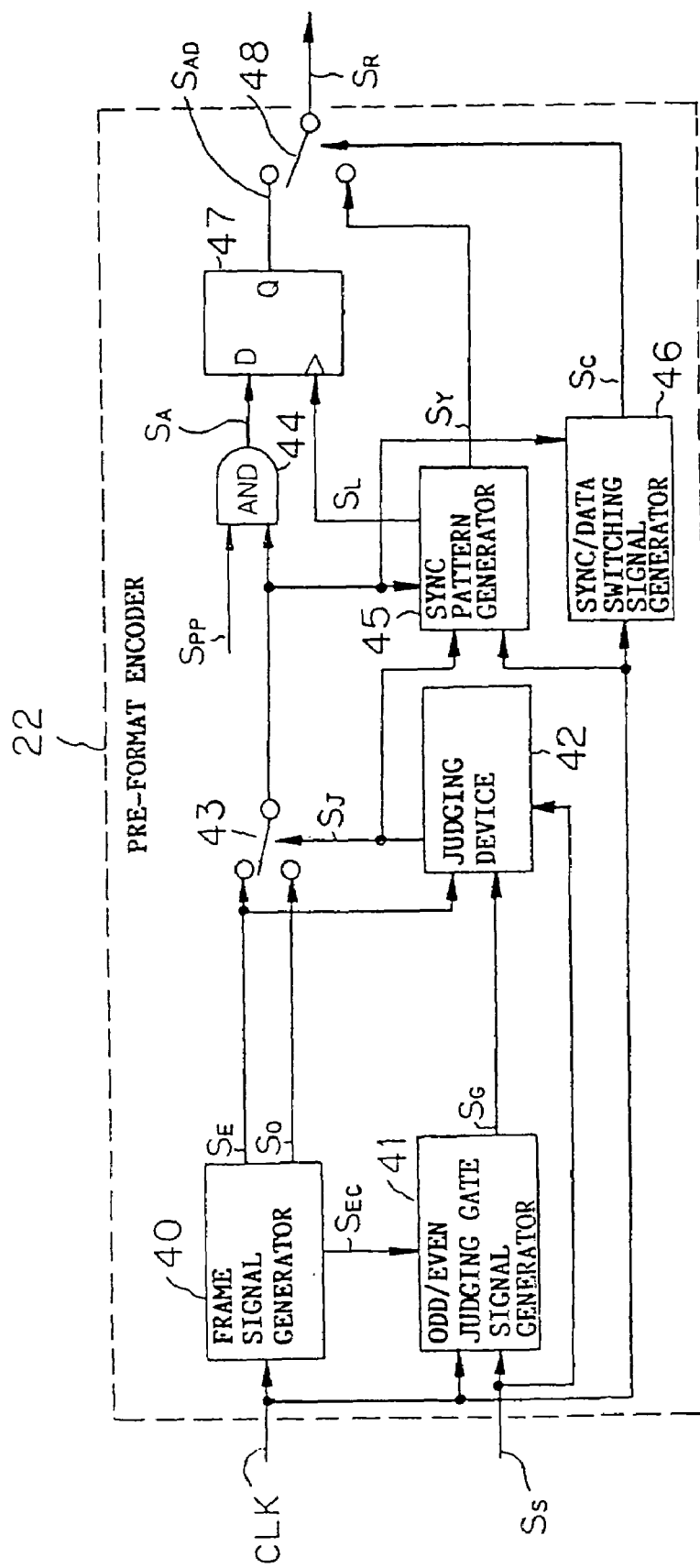
FIG. 4 is a block diagram showing a schematic configuration of a pre-format encoder of the embodiment.
Figure 5:
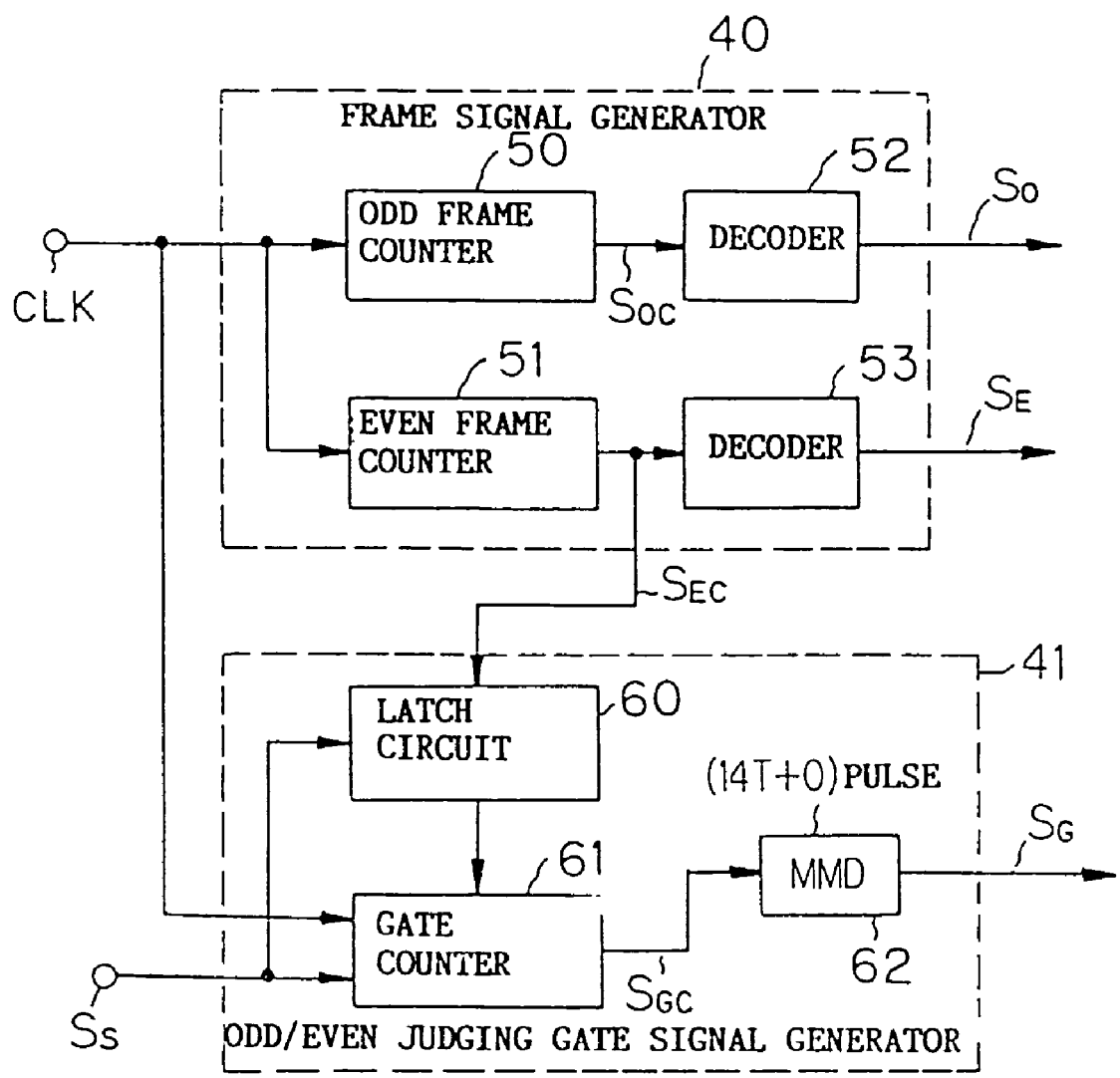
FIG. 5 is a block diagram showing schematic configurations of a frame signal generator and an ODD/EVEN judging gate signal generator of the embodiment.

At first, a configuration of the cutting machine of the embodiment is explained with reference to FIGS. 3 to 5. The cutting machine shown in FIGS. 3 to 5 is intended to fabricate a stamper disk for mass-producing the DVD-R 1, in which the pre-pit 4 is formed and thereby the pre-information is recorded in accordance with the present invention.

The whole configuration of the cutting machine is firstly explained with reference to FIG. 3.

Figure 3:
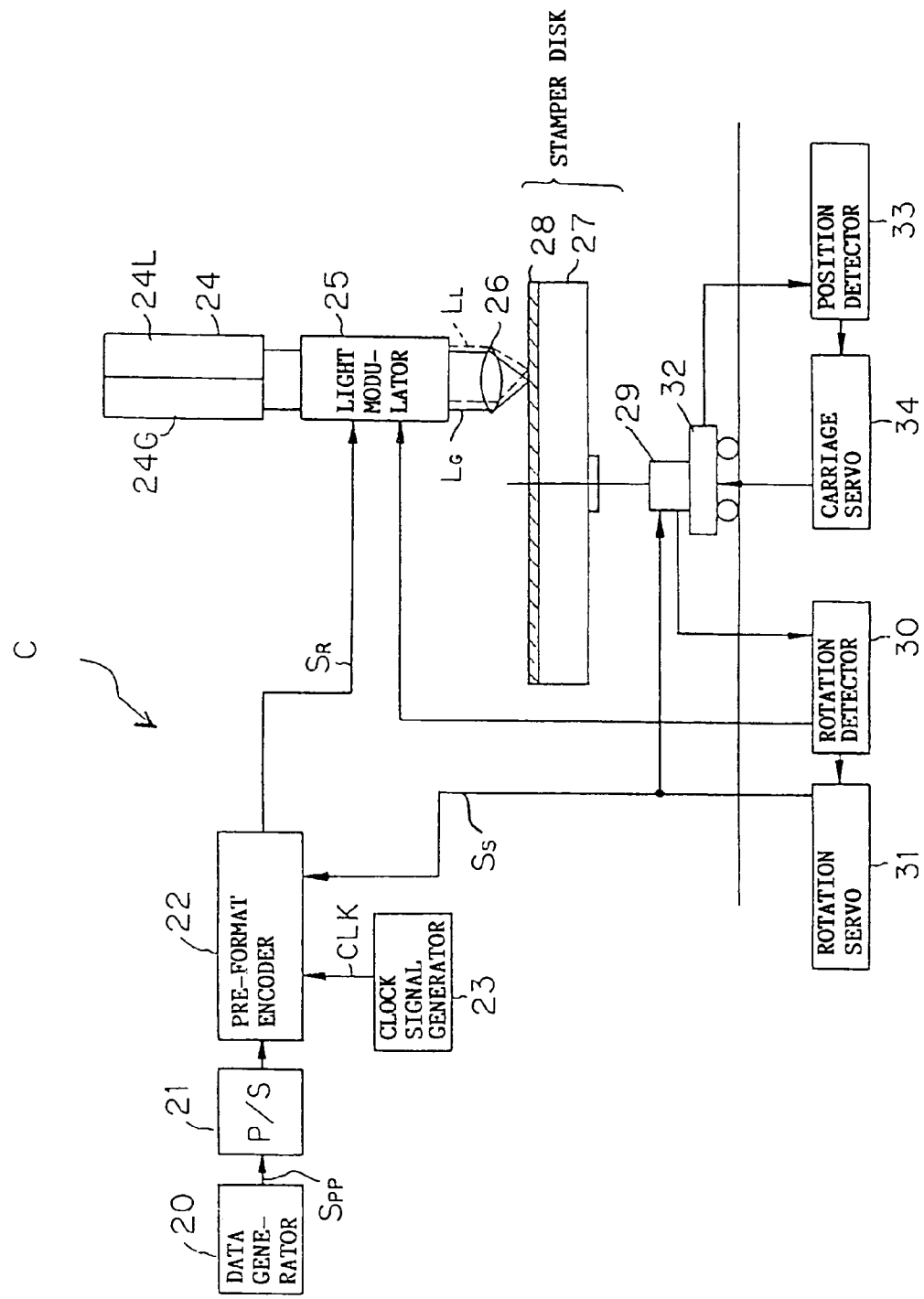
FIG. 3 is a block diagram showing a schematic configuration of a cutting machine as an embodiment of the present invention.

As shown in FIG. 3, a cutting machine C of the embodiment is provided with: a data generator 20 for generating a data pre-information $S_{PP}$ to be recorded; a parallel/serial (P/S) convertor 21 for parallel/serial-converting the data pre-information $S_{PP}$; a pre-format encoder 22 for generating a record pre-information $S_R$ to form the pre-pit 4 by the recording format shown in FIG. 2 on the basis of the data pre-information $S_{PP}$; a clock signal generator 23 for outputting a clock signal CLK (a period (cycle) is assumed to be the above mentioned T) used in the pre-formatting to the pre-format encoder 22; a laser generator 24 for emitting a light beam $L_G$ to form the groove track 2 shown in FIG. 1 to a substrate of the DVD-R 1 and for emitting a light beam $L_L$ to form the land track 3 and the pre-pit 4 shown in FIG. 1; a light modulator 25 for modulating the emitted light beam $L_L$ on the basis of a record pre-information $S_R$; an objective lens 26 for collecting the light beams $L_G$ and $L_L$ on the stamper disk; a spindle motor 29 for rotating the stamper disk; a rotation detector 30 for detecting a rotation number of the stamper disk; a rotation servo circuit 31 for servo-controlling a rotation of the stamper disk on the basis of the detected rotation number and for outputting one rotation detection signal Ss one time for each rotation of the stamper disk to the pre-format encoder 22; a carriage unit 32 for carrying in a radial direction of the stamper disk the spindle motor 29 relative to the stamper disk corresponding to the rotation of the stamper disk, in order to form the spiral groove track 2 and the spiral land track 3; a position detector 33 for detecting a position of the carriage unit 32; and a carriage servo circuit 34 for servo-controlling a movement of the carriage unit 32 on the basis of the position of the carriage unit 32 detected by the position detector 33. Here, the laser generator 24 is provided with an emitting device 24G for emitting the light beam $L_G$ and an emitting device 24L for emitting the light beam $L_L$. Although the light beam $L_L$ is modulated by the light modulator 25 on the basis of the record pre-information $S_R$, the light beam $L_G$ is irradiated to the stamper disk by a DC (direct current) driving device (not shown) while always keeping a constant light strength. Further, the light beam $L_L$ to form the land track 3 and the pre-pit 4 and the light beam $L_G$ to form the groove track 2 are irradiated such that irradiation positions are gradually shifted in the radial direction of the stamper disk, and accordingly they simultaneously form the concentrically spiral land track 3 and groove track 2.

On the other hand, the stamper disk is provided with a glass substrate 27 as a main body of the stamper disk, and a resist (e.g. photo-sensitive material) 28 for forming the pre-pit 4 coated on the glass substrate 27.

Incidentally, in the above mentioned configuration, one example of a recording means is constituted by the laser generator 24, the light modulator 25 and the objective lens 26.

Next, a detailed configuration of the pre-format encoder 22 is explained with reference to FIG. 4.

As shown in FIG. 4, the pre-format encoder 22 is provided with: a frame signal generator 40, as one example of a control information timing signal generating means, an even number control information timing signal generating means and an odd number control information timing signal generating means, for outputting an EVEN frame signal $S_E$ corresponding to the EVEN frame and an ODD frame signal So corresponding to the ODD frame, in accordance with the timing of a frame signal indicating each synchronization frame shown in FIG. 2, on the basis of the inputted clock signal CLK, and for outputting an EVEN frame count signal $S_{EC}$ outputted by an EVEN frame counter described later that is reset each time the EVEN frame signal $S_E$ corresponding to one EVEN frame is generated; an ODD/EVEN judging gate signal generator 41 for outputting a gate signal $S_G$ to judge whether the synchronization frame for forming the pre-pit 4 to be recorded during a term corresponding to one round in the stamper disk is set to the EVEN frame or the ODD frame, on the basis of the clock signal CLK and one rotation detection signal Ss; a judging device 42, as one example of a selecting means, for outputting a judgment signal $S_J$ to judge whether the synchronization frame on which the pre-pit 4 is to be recorded is set to the EVEN frame or the ODD frame, on the basis of the EVEN frame signal $S_E$, the gate signal $S_G$ and one rotation detection signal Ss; a switch 43, as one example of a selecting means, for selectively switching and outputting the EVEN frame signal $S_E$ or the ODD frame signal So, on the basis of the judgment signal $S_J$; an AND circuit 44 for calculating a logical product of the EVEN frame signal $S_E$ or the ODD frame signal So outputted by the switch 43 and the data pre-information $S_{PP}$ outputted by the parallel/serial convertor 21 (FIG. 3) to thereby output a logical product signal $S_A$; a synchronization pattern generator 45 for outputting a synchronization signal $S_Y$ corresponding to either one of a synchronization pattern in the synchronization pre-information to be recorded on the EVEN frame or a synchronization pattern in the synchronization pre-information to be recorded on the ODD frame, by using the judgment signal $S_J$, on the basis of the EVEN frame signal $S_E$ or the ODD frame signal So outputted by the switch 43, and for outputting a data latch pulse $S_L$ of controlling a delay amount in a delay flip-flop circuit 47 described later; a synchronization/data switching signal generator 46 for outputting a synchronization/data switching signal Sc to switch between the synchronization pre-information and the data pre-information, on the basis of the EVEN frame signal $S_E$ or the ODD frame signal So outputted by the switch 43; the delay flip-flop circuit 47 for outputting a delay logical product signal $S_{AD}$ in which the logical product signal $S_A$ is delayed by a term of 2T, on the basis of the data latch pulse $S_L$ and the logical product signal $S_A$; a switch 48 for switching between the delay logical product signal $S_{AD}$ and the synchronization signal $S_Y$, based on the synchronization/data switching signal Sc to thereby output as the record pre-information $S_R$. In the above mentioned configuration, the switch 43 is normally switched to a side of the EVEN frame signal $S_E$. Further, the switch 48 is normally switched to a side of the delay logical product signal $S_{AD}$.

Next, detailed configurations of the frame signal generator 40 and the ODD/EVEN judging gate signal generator 41 are explained with reference to FIG. 5.

As shown in FIG. 5, the frame signal generator 40 is provided with: an ODD frame counter 50 for measuring (counting) an elapsed time from a timing at which the ODD frame signal So is generated, on the basis of the clock signal CLK, to thereby output an ODD frame count signal $S_{OC}$; an EVEN frame counter 51 for measuring an elapsed time from a timing at which the EVEN frame signal $S_E$ is generated, on the basis of the clock signal CLK, to thereby output an EVEN frame count signal $S_{EC}$; a decoder 52 for outputting, as the ODD frame signal So, a pulse with a length of 2T, at a time of outputting a next ODD frame signal So, on the basis of the ODD frame count signal $S_{OC}$ outputted by the ODD frame counter 50; and a decoder 53 for outputting, as the EVEN frame signal $S_E$, a pulse with a length of 2T, at a time of outputting a next EVEN frame signal $S_E$, on the basis of the EVEN frame count signal $S_{EC}$ outputted by the EVEN frame counter 51.

On the other hand, as shown in FIG. 5, the ODD/EVEN judging gate signal generator 41 is provided with: a latch circuit 60, as one example of a memory means, for latching a value of the EVEN frame signal $S_{EC}$ at this time, each time one rotation detection signal Ss is inputted (in other words, each time the stamper disk is rotated one time), on the basis of the EVEN frame count signal $S_{EC}$ and one rotation detection signal Ss; a gate counter 61 for time-measuring while being reset to the same value and by the same period as the EVEN frame counter 51, on the basis of the clock signal CLK and one rotation detection signal Ss and for outputting a gate count signal $S_{GC}$ which value is updated to a value recorded in the latch circuit 60, each time one rotation detection signal Ss is inputted; and a mono-multi-vibrator (MMD) 62 for outputting a gate signal $S_G$ with a predetermined length, each time the value of the gate counter 61 becomes maximum and is reset, on the basis of the gate count signal $S_{GC}$.

In the cutting machine C having the above mentioned configuration, an operation thereof is next explained with reference to timing charts shown in FIGS. 6A to 8.

At first, an operation of the frame signal generator 40 for generating the ODD frame signal So and the EVEN frame signal $S_E$ is explained with reference to FIG. 6A.

Figure 6A:
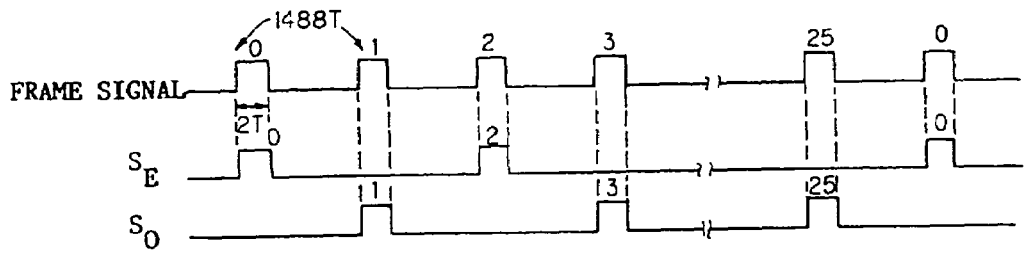
FIG. 6A is a timing chart showing an EVEN frame signal and an ODD frame signal in the pre-format encoder.

As shown in FIG. 6A, in case of the frame signal, a pulse is generated at an interval of one synchronization frame length of 1488T, while in case of the ODD frame signal So, a pulse with a length of each 2T is generated at an interval equal to two times of the frame signal from a timing corresponding to a first synchronization frame. This pulse of the ODD frame signal So is continuously generated by measuring a time corresponding to 2976T (=1488T×2) from the timing of the first synchronization frame, by the ODD frame counter 50, and by repeating the generation of the pulse with the length of 2T by the decoder 52, each time the above mentioned time elapses.

On the other hand, in case of the EVEN frame signal $S_E$, a pulse with a length of each 2T is generated at an interval equal to two times of the frame signal from a timing corresponding to a 0th synchronization frame. Similarly to the case of the ODD frame signal So, this EVEN frame signal $S_E$ is continuously generated by measuring a time corresponding to 2976T from the timing of the 0th synchronization frame, by the EVEN frame counter 51, and by repeating the generation of the pulse with the length of 2T by the decoder 53, each time the above mentioned time elapses. At this time, the EVEN frame count signal $S_{EC}$ outputted by the EVEN frame counter 51 is outputted to the latch circuit 60 within the ODD/EVEN judging gate signal generator 41.

Next, an operation of the ODD/EVEN judging gate signal generator 41 is explained with reference to FIG. 7.

Figure 7:
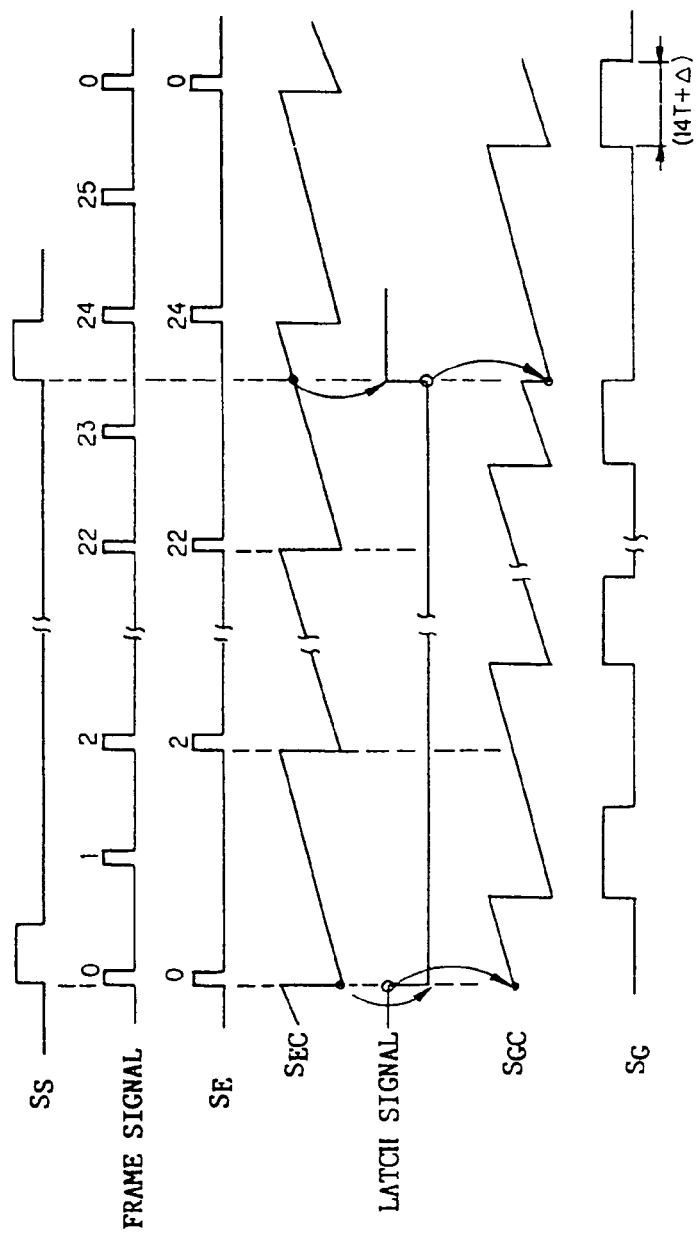
FIG. 7 is a timing chart showing operations of the frame signal generator and the ODD/EVEN judging gate signal generator.

As shown in FIG. 7, when the EVEN frame count signal $S_{EC}$ to generate the EVEN frame signal $S_E$ is generated in the frame signal generator 40 in correspondence with the frame signal, the latch circuit 60 latches (stores) the value of the EVEN frame count signal $S_{EC}$ at a timing when one rotation detection signal Ss is inputted.

At this time, the gate counter 61 time-measures while being reset to the same value and by the same period as the EVEN frame counter 51 on the basis of the clock signal CLK. Each time one rotation detection signal Ss is inputted, the gate counter 61 is updated to a value stored in the latch circuit 60 at that time, and it repeats the time-measurement from its value. That is, the gate counter 61 repeats the same operation as the EVEN frame counter 51 in the immediately previous recording operation which is one rotation (of the stamper disk) prior to the present operation. In other words, position information of the pre-pit 4 recorded on the EVEN frame in the previous recording operation, which is one rotation prior to the present operation, is included in the value of the gate counter 61.

Each time this value of the gate counter 61 (i.e. the signal $S_{SG}$) becomes maximum and is reset, the mono-multi-vibrator 62 generates a pulse signal as the gate signal $S_G$. Thus, the position information of the pre-pit 4 recorded on the EVEN frame in the previous recording operation one rotation prior to the present operation is also included in this gate signal $S_G$. A pulse width of this gate signal $S_G$ is assumed to be a pulse width of (14T+Δ), which is the sum of 14T (this is the length of the synchronization pre-information) and a length corresponding to an increment Δ in a length of the land track 3 corresponding to one rotation of the stamper disk, which is increased by one rotation of the stamper disk (more actually, Δ=2×π× (a track pitch between the land tracks 3).

Next, an operation of the judging device 42 (FIG. 4) is explained with reference to FIG. 6B.

Figure 6B:
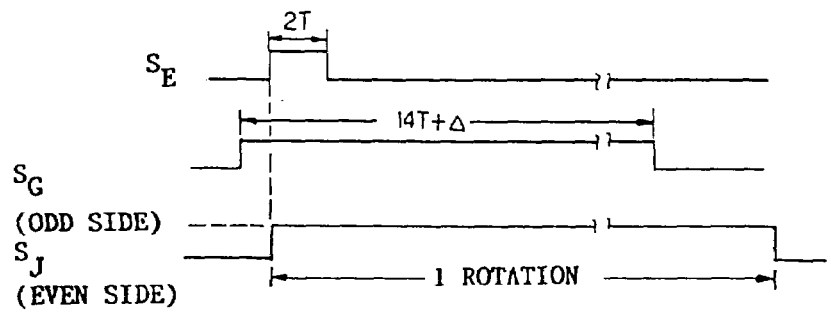
FIG. 6B is a timing chart showing an operation of a judging device in the pre-format encoder.

As shown in FIG. 6B, in the judging device 42, if the EVEN frame signal $S_E$ is within a range of the gate signal $S_G$ the judgment signal $S_J$ as shown in FIG. 6B is outputted so as to switch the switch 43, which is normally switched to the side of the EVEN frame signal $S_E$, to the side of the ODD frame signal So, at a rising timing of the EVEN frame signal $S_E$. Accordingly, the switch 43 outputs the ODD frame signal So to the AND circuit 44.

Thus, normally, since the EVEN frame signal $S_E$ is outputted to the AND circuit 44, the pre-pit 4 is formed at a position of the EVEN frame, on the basis of the EVEN frame signal $S_E$, and thereby the pre-information is recorded. However, in the judging device 42, if the EVEN frame signal $S_E$ enters within the range of the gate signal $S_G$, that is, if the position of the pre-pit 4, which has been recorded in the previous recording operation one rotation prior to the present operation, (its information is included in the gate signal $S_G$) is close to the present position (e.g. the position of the EVEN frame) of the pre-pit in the present rotation (e.g. within the range of (14T+Δ) with respect to the position of-the pre-pit 4 one rotation prior to the present position), the judgment signal $S_J$ is outputted so as to switch the switch 43 to the side of the ODD frame signal So, and thereby the pre-pit 4 in the present rotation is formed at the position of the ODD frame.

When an action of one rotation under the condition that the pre-pit 4 is recorded on the position of the ODD frame is detected by one rotation detection signal Ss, in a rotation after that, the judgment signal $S_J$ to switch the switch 43 to the side of the EVEN frame signal $S_E$ is outputted by the judging device 42, so as to again form the pre-pit 4 on the position of the EVEN frame.

Next, operations of the AND circuit 44 and the delay flip-flop circuit 47 are explained with reference to FIG. 6C.

The AND circuit 44 calculates a logical product of the EVEN frame signal $S_E$ or the ODD frame signal So outputted by the switch 43 and the data pre-information $S_{PP}$ outputted by the parallel/serial convertor 21 to thereby output the logical product signal $S_A$ with a pulse width of 2T. This is intended to resolve the data pre-information $S_{PP}$ by each bit to thereby record only the data pre-information $S_{PP}$ of one bit (corresponding to "1") (refer to FIG. 2) having a pulse width of 2T on one synchronization frame.

The delay flip-flop circuit 47 delays the logical product signal $S_{AD}$ by a time of 2T, on the basis of the latch data pulse $S_L$ from the synchronization pattern generator 40, to thereby generate a delay logical product signal $S_{AD}$. After that, this delay logical product signal $S_{AD}$ is outputted to the switch 48 as the data pre-information to be recorded.

The reason why the delay flip-flop circuit 47 delays the logical product signal $S_A$ is described below. That is, the synchronization signal (with a length of 14T) of the record signal is recorded on the groove track 2 adjacent to the pre-pit, in a record information device described later. However, if the logical product signal $S_A$ is not delayed at this time, there may be a case that a rising timing of the synchronization signal of the record signal and a rising timing of the pre-information are equal or close to each other. In this case, it is difficult to separate and reproduce the pre-information and the synchronization signal. Further, the delay amount of the logical product signal $S_A$ is defined as 2T, since a margin must be considered in order to prevent that the rising timing of the synchronization signal and the rising timing of the pre-information be close to each other because of an effect of a jitter at a time of recording the record signal and the like.

Next, an operation of the synchronization pattern generator 45 (FIG. 4) is explained with reference to FIG. 8A.

Figure 8A:
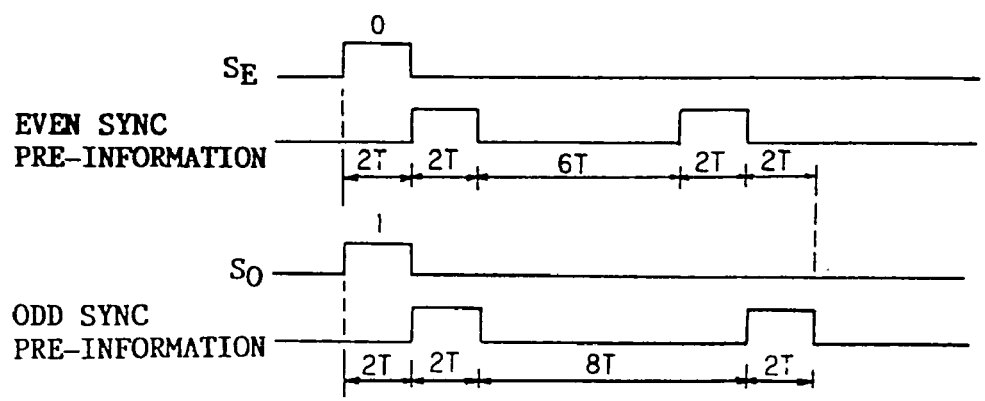
FIG. 8A is a timing chart showing an operation of a synchronization pattern generator in the pre-format encoder.

In a case that the judgment signal $S_J$ outputted by the judging device 42 is a signal indicative of the EVEN frame signal $S_E$, the synchronization pattern generator 45 generates the EVEN synchronization pre-information having a synchronization pattern, as shown in FIG. 8A, corresponding to the EVEN frame signal $S_E$ outputted by the switch 43 to thereby output as the synchronization signal $S_Y$ to the switch 48.

On the other hand, in a case that the judgment signal $S_J$ outputted by the judging device 42 is a signal indicative of the ODD frame signal So, the synchronization pattern generator 45 generates the ODD synchronization pre-information having a synchronization pattern, as shown in FIG. 8A, corresponding to the ODD frame signal So outputted by the switch 43 to thereby output as the synchronization signal $S_Y$ to the switch 48.

Figure 6C:
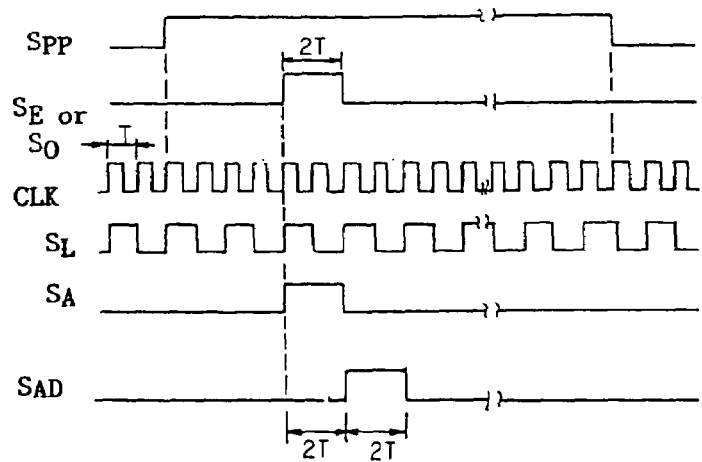
FIG. 6C is a timing chart showing operations of an AND circuit and a delay flip-flop circuit in the pre-format encoder.

In parallel to these operations, the synchronization pattern generator 45 extends the clock signal CLK by a term of 1T to thereby generate a data latch pulse $S_L$ having a period of 2T, and outputs it to the delay flip-flop circuit 47 (refer to FIG. 6C).

Finally, an operation of the synchronization/data switching signal generator 46 is explained with reference to FIG. 8B.

Figure 8B:
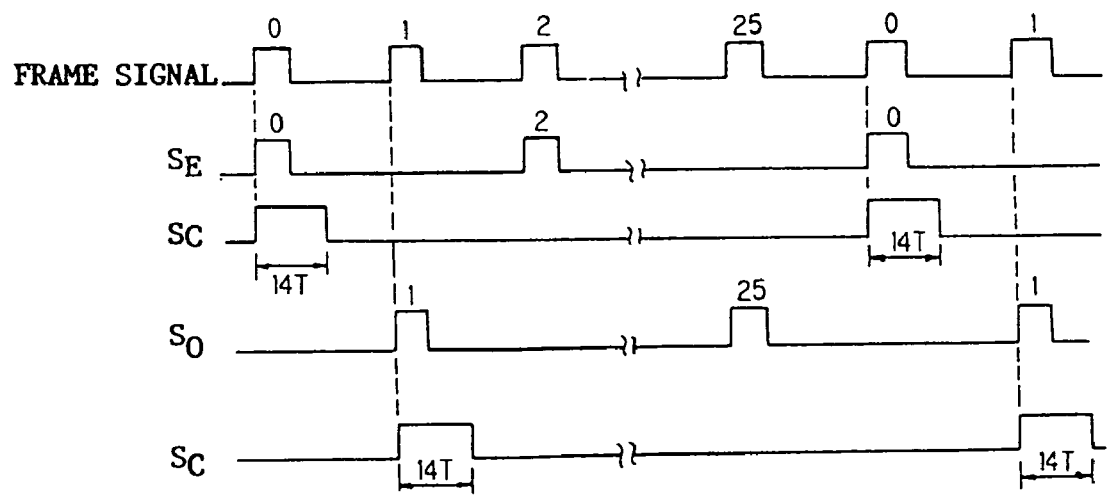
FIG. 8B is a timing chart showing an operation of a synchronization data switching signal generator in the pre-format encoder.

As shown in FIG. 8B, in the synchronization/data switching signal generator 46, in a case that the signal outputted by the switch 43 is the EVEN frame signal $S_E$, a synchronization/data switching signal Sc which is in the "H" state for a term of 14T (corresponding to a length of the EVEN synchronization pre-information) from the rising timing of the 0th EVEN frame signal $S_E$ is outputted, in order to record the EVEN synchronization pre-information on a position of the 0th EVEN frame signal $S_E$, among the EVEN frames. Accordingly, the switch 48 is switched to a side of the synchronization signal $S_Y$ only for the term of 14T from the rising timing of the 0th EVEN frame signal $S_E$. As a result, the EVEN synchronization pre-information outputted by the synchronization pattern generator 45 is recorded on a position of the 0th EVEN frame signal $S_E$.

On the other hand, in a case that the signal outputted by the switch 43 is the ODD frame signal So, a synchronization/data switching signal Sc which is in the "H" state for a term of 14T (corresponding to a length of the ODD synchronization pre-information) from a rising timing of a first ODD frame signal So is outputted, in order to record the ODD synchronization pre-information on a position of the first ODD frame signal So, among the ODD frames. Accordingly, the switch 48 is switched to the side of the synchronization signal $S_Y$ only for the term of 14T from the rising timing of the first ODD frame signal So. As a result, the ODD synchronization pre-information is recorded on a position of the first ODD frame signal So.

With respect to the operations of the cutting machine C of the embodiment as mentioned above, when concluding the features thereof, in a case where the position of the pre-pit 4 in the previous recording operation one rotation prior to the present operation (which is normally recorded on the position of the EVEN frame) is close to the position of a pre-pit 4 in a next rotation (i.e. the present rotation), more actually in a case where it is judged by the judging device 42 that the EVEN frame signal $S_E$ in the next rotation enters within the range of the gate signal $S_G$ including the information of the previous position of the pre-pit 4 one rotation prior to the present position, the record pre-information $S_R$ is generated such that the pre-pit 4 in the next rotation is recorded on the position of the ODD frame signal So, especially by the operations of the ODD/EVEN judging gate signal generator 41 and the judging device 45 among the cutting machine C of the embodiment. Based on it, the light beam $L_L$ is modulated by the light modulator 25, and thereby the land track 3 including the pre-pit 4 is formed on the DVD-R 1. At this time, the groove track 2 is formed so as to be located parallel to the land track 3 by the light beam $L_G$ outputted simultaneously with the light beam $L_L$.

As mentioned above, according to the cutting machine C of the embodiment, the pre-pit 4 is formed only on the position corresponding to the EVEN frame or the position corresponding to the ODD frame, in one rotation of the stamper disk. Thus, as compared with the case in which the pre-pits 4 are recorded for every synchronization frame, it is possible to reduce the number of the pre-pits 4 throughout the DVD-R 1. Further, when forming the pigment film 5 (refer to FIG. 1) to form the groove track 2 for the DVD-R 1 on which the pre-pit 4 is formed, the pigment film 5 can have a layer with a predetermined thickness necessary for the design.

When explaining this effect, typically, in order to speedily and firstly detect the pre-information at a time of forming the pre-pit 4 onto the land track 3, all the pre-pits 4 are formed collectively at a single position on a predetermined portion of the land track 3, and then the pre-pits 4 are repeatedly formed on the land track 3 many times at a predetermined interval, and thereby the pre-information is recorded.

When actually manufacturing the DVD-R 1, the groove track 2, the land track 3 and the necessary pre-pit 4 are formed at first. After that, material of the pigment film 5 is coated on the DVD-R 1 by means of a spin coating method, for example. Then, this is treated by a baking (heating) process and the like to thereby form a recording layer having the necessary film thickness.

However, in the method of forming the necessary pre-pit 4 collectively at the single position on the land track 3 as mentioned above, a top surface of the pre-pit 4 (in a case that an irradiation direction of the light beam is upward) is normally flush with a top surface of the groove track 2 (refer to FIG. 1). Thus, the material of the pigment film 5 which should inherently stay on the groove track 2 flows into the pre-pit 4. Therefore, it is impossible to form the pigment film 5 having the predetermined film thickness necessary for the design for the groove track 2. Then, in a case that the pigment film 5 having the predetermined film thickness can not be formed, when reproducing the record information recorded by the pit formed on the pigment film 5, the direct current (DC) element in a reproduction signal may be changed, and the jitter may be generated because of unstableness of a shape of the pit. This results in a problem that the record information cannot be reproduced accurately.

In contrast with this, as mentioned above, according to the cutting machine C of the embodiment, as compared with the case in which the pre-pits 4 are recorded for every synchronization frame, it is possible to reduce the number of the pre-pits 4, and further, only the pre-pit 4 with the length of 2T is formed in one synchronization frame. Thus, when forming the pigment film 5 for the DVD-R 1 on which the pre-pit 4 is formed, the pigment film 5 can have the layer with the predetermined thickness necessary for the design. As a result, it is possible to prevent the above mentioned direct current (DC) element from being changed and protect the jitter due to the unstableness of the pit shape from being generated, to thereby reproduce the record information accurately.

Further, according to the cutting machine C of the embodiment, in a case that the position of the pre-pit 4 recorded on the position of the EVEN frame in the previous recording operation one rotation prior to the present operation is close to the position of the pre-pit 4 in the next rotation (i.e. the present rotation), the pre-pit 4 is formed on the position of the ODD frame in the next rotation. After further making one rotation in that state, the pre-pit 4 is formed on the original position of the EVEN frame. Thus, the positions of the pre-pits 4 do not overlap with each other in the guide tracks 3 adjacent to each other. Then, when detecting the pre-information at a time of recording the record information as described later, when reading out the pre-information on one guide track 3, it is possible to prevent the leakage of the pre-information in the guide tracks 3 adjacent to each other and possible to read out the pre-information accurately.

At this time, the gate signal $S_G$ is set to have a pulse width equal to a length of (14T+Δ) including an increment Δ of a length corresponding to one round of the land track 3 for each rotation in the stamper disk. Thus, the positions of the pre-pits 4 on the land tracks 3 adjacent to each other are never close to each other, due to a change of a radial position on the stamper disk. As a result, the positions of the pre-pits 4 on the land tracks 3 adjacent to each other can be set to positions which are not located on the same straight line in the radial direction, in any portion on the stamper disk.

Moreover, since storing the frame signal used at a time of recording the pre-information in one of the guide tracks 3 to thereby output the frame signal at a time of recording the pre-information in the guide tracks 3 adjacent to each other, the position of the pre-pit 4 of one of the guide tracks 3 can be made different from the position of the adjacent guide track 3, under the simple configuration.

(II) Embodiment of Information Recording Apparatus

Next, an embodiment of the information recording apparatus will be explained with reference to FIGS. 9 to 13.

At first, a whole configuration of the information recording apparatus of the embodiment is explained with reference to FIG. 9.

Figure 9:
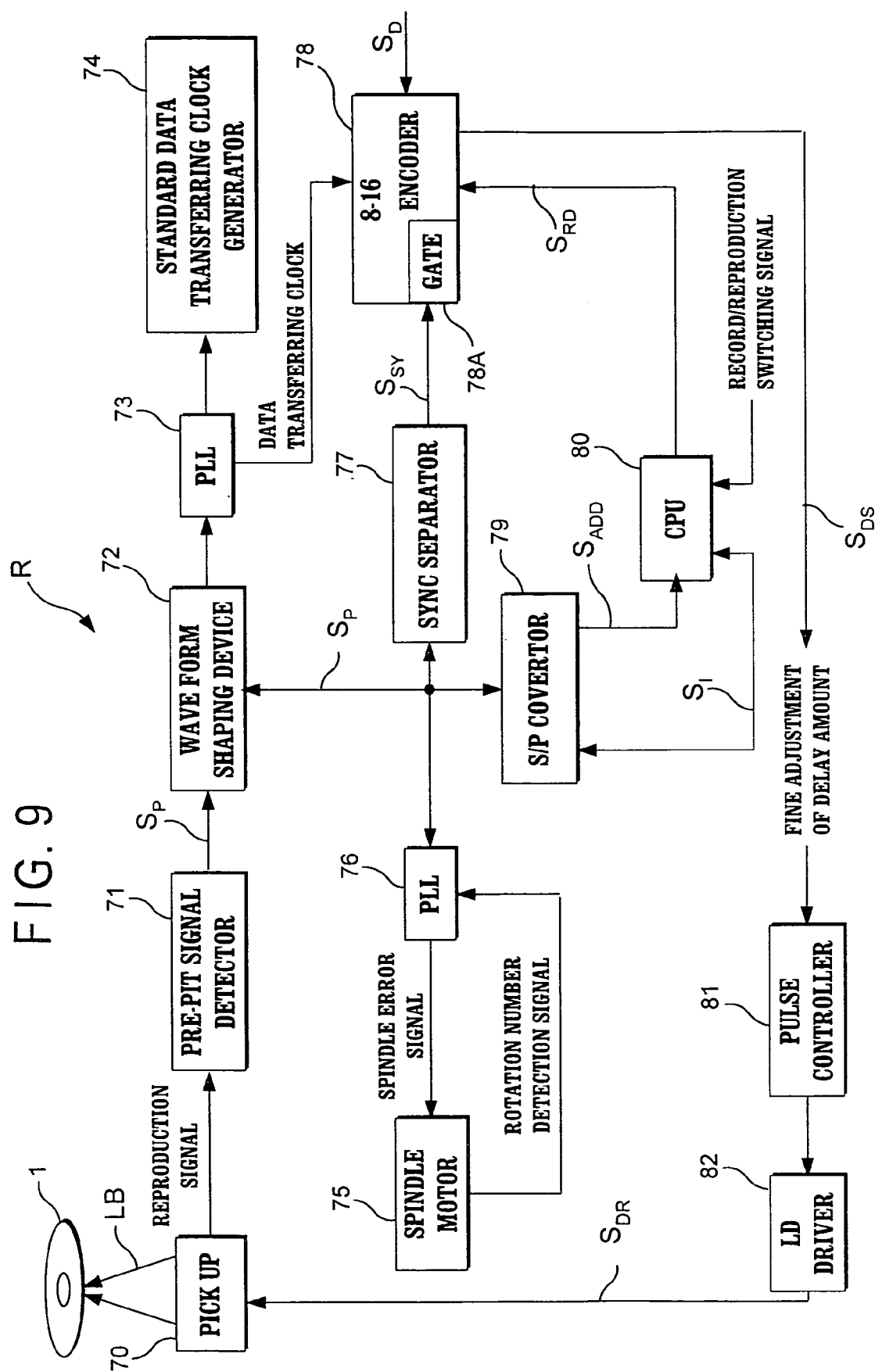
FIG. 9 is a block diagram showing a schematic configuration of an information recording apparatus as another embodiment of the present invention.

As shown in FIG. 9, an information recording apparatus R of the embodiment is provided with: an optical pickup 70, as one example of a record information recording means, which contains a laser diode, an objective lens described later, a polarization beam splitter, a light detector and the like that are not shown, for reading out the pre-pit 4 of the DVD-R 1, on which the guide tracks 3, the pre-pits 4 and the groove tracks 2 are formed by the above mentioned cutting machine C, to thereby detect the pre-information Sp, and for further emitting the light beam LB as the record light to record the record information such as the video information, the audio information and the like; a pre-pit signal detector 71 for detecting a pre-pit signal (i.e. pre-information Sp) from a reproduction signal detected by the pickup 70 by a tangential push-pull method described later; a wave form shaping device 72 for wave-form-shaping the detected pre-information Sp (including the synchronization pre-information and the data pre-information); a PLL (Phase Locked Loop) circuit 73 for phase-comparing a standard data transferring clock outputted by a standard data transferring clock generator 74 with the detected pre-pit signal to thereby output a data transferring clock in synchronization with the pre-information Sp; a spindle motor 75 for rotating the DVD-R 1; a PLL circuit 76 for phase-comparing the detected pre-pit signal with a rotation number detection signal outputted by the spindle motor 75 and then outputting a spindle error signal to the spindle motor 75 to thereby servo-control the rotation number of the spindle motor 75 to a predetermined number; a synchronization separator 77 for separating a synchronization pre-information $S_{SY}$ (a synchronization pattern is the EVEN synchronization pre-information or the ODD synchronization pre-information shown in FIG. 2) from the pre-information Sp as the detected pre-pit signal; an 8–16 encoder 78, as one example of a generating means, which has a gate 78A opened by the synchronization pre-information $S_{SY}$ outputted by the synchronization separator 77 for 8–16-modulating an input signal $S_D$ as an externally inputted record signal to be recorded based on the data transferring clock outputted by the PLL 73, generating a record information stream $S_{DS}$ and then outputting it when the gate 78A is opened; a serial/parallel (S/P) convertor 79 for serial/parallel-converting the detected pre-information Sp, and outputting an address information $S_{ADD}$ in the pre-information Sp when requested by an interrupt signal $S_I$ from a CPU 80 described later; the CPU 80 for outputting the interrupt signal $S_I$ when a writing order of the record information is inputted by an external record/reproduction switching signal, and outputting a preparation signal $S_{RD}$ based on the address information $S_{ADD}$; a pulse controller 81 for pulse-controlling and outputting the record information stream $S_{DS}$ which is outputted by the 8–16 encoder 78 and whose delay amount is slightly adjusted; and an LD (LASER Diode) driver 82 for outputting a drive signal $S_{DR}$ on the basis of the pulse-controlled record information stream $S_{DS}$ to thereby drive the laser diode of the optical pickup 70 so as to output the light beam LB as the record light.

Figure 10:
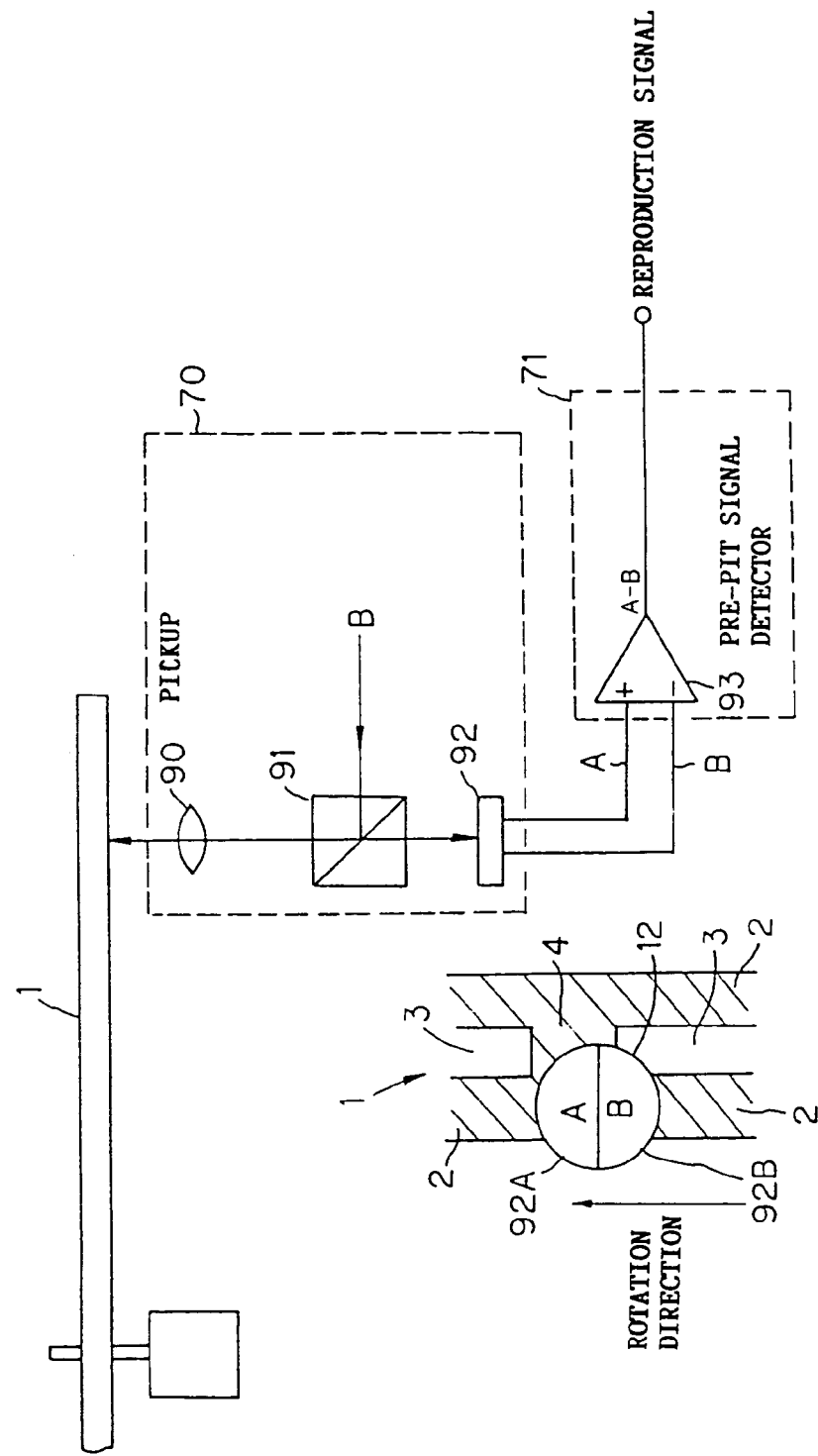
FIG. 10 is a block diagram showing schematic configurations of an optical pick-up and a pre-pit signal detector of the embodiment.

Next, the above mentioned tangential push-pull method used to detect the pre-information Sp in the information recording apparatus R is explained, with detailed configurations of the pickup 70 and the pre-pit signal detector 71, with reference to FIGS. 10 and 11.

The tangential push-pull method refers to a push-pull method in a rotation direction of the DVD-R 1. This is a method of reproducing the above mentioned pre-information, on the basis of a differential signal of two partial detectors in the light detector, in which a reflection light from the light spot SP by the light beam LB formed on the land track 3 of the DVD-R 1 is detected by the two partial detectors divided by a division line optically vertical to a moving direction (i.e. the rotation direction of the disk) of the pre-pit 4.

That is, more actually, as shown in FIG. 10, in the optical pickup 70, the light beam LB as the record light (the reproduction light to the pre-pit 4) generated by the laser diode and the like (not shown) is reflected on the polarization beam splitter 91, and collected on the groove track 2 and the land track 3 of the DVD-R 1 (refer to FIG. 1) by the objective lens 90. The reflection light of the light beam LB, which is modulated by the pre-pit 4 and in which a polarization surface is rotated by the reflection on the DVD-R 1, is transmitted through the polarization beam splitter 91 by the rotation of the polarization surface, and is irradiated to respective light-receiving surfaces of the light detector 92, which is divided into two partial detectors 92A and 92B by the division line optically vertical to the rotation direction of the DVD-R 1, and then it is detected. Light-receiving-outputs of the respective partial detectors 92A and 92B (in the following explanation, the outputs of the respective partial detectors are indicated by symbols A and B) are subtracted by a subtractor 93 constituting the pre-pit signal detector 71. A differential signal (A–B) thereof is outputted to the wave form shaping device 72 as the reproduction signal (pre-information Sp).

Next, the generation of the differential signal (tangential push-pull signal) (A–B) by means of the light detector 92 and the subtractor 93 is explained with reference to FIGS. 11A and 11B.

Figure 11A:
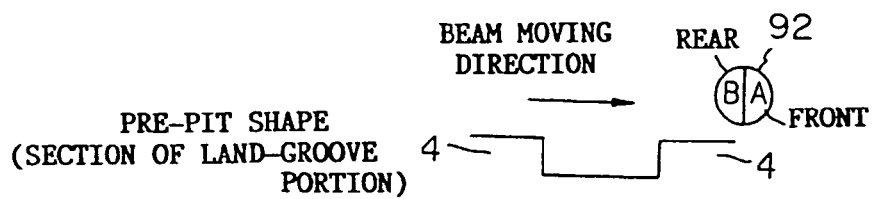
FIG. 11A is a schematic sectional view of showing a shape of the pre-pit.
Figure 11B:
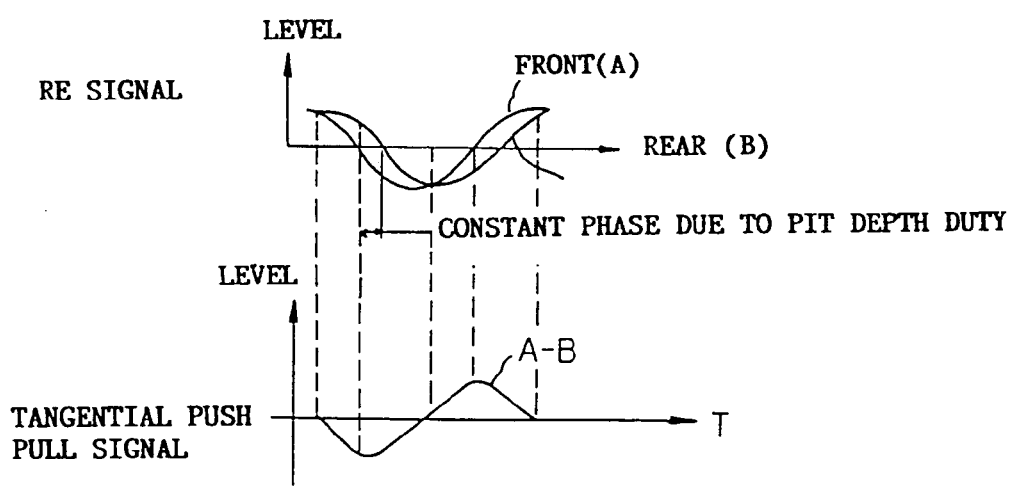
FIG. 11B is a graph of showing wave forms of an RF signal and a tangential push-pull signal.

In FIG. 11A, when the light detector 92 receives the reflection light from the pre-pit 4 having a shape indicative of a section view in the rotation direction of the DVD-R 1, the light-receiving outputs of the partial detectors 92A and 92B are outputted from the respective partial detectors 92A and 92B as RF (Radio Frequency) signals A (front signal) and B (rear signal) whose phases are different from each other, as shown in FIG. 11B, on the basis of positional deviations thereof. Then, the subtractor 93 determines a difference between the respective RF signals. Accordingly, the differential signal (tangential push-pull signal) (A–B) is generated as shown in FIG. 11B.

Next, an operation of the information recording apparatus R for recording the record information on the basis of the pre-information Sp detected by the tangential push-pull method is explained with reference to a flow chart shown in FIG. 12.

Figure 12A:
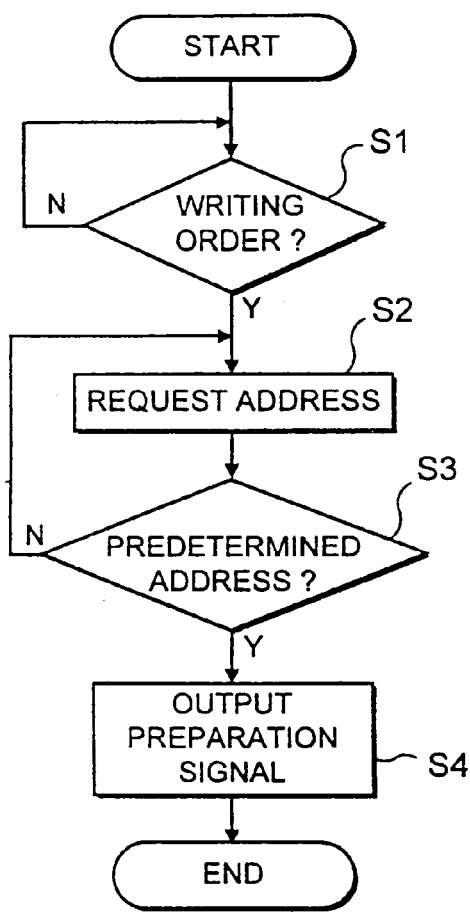
FIG. 12A is a flow chart showing an operation of a CPU of the embodiment.

At first, an operation as for the CPU 80 as a center is explained by using FIG. 12A.

As shown in FIG. 12A, in the CPU 80, it is firstly judged whether or not the writing order of the record information is inputted from the exterior (Step S1). If the writing order is not inputted (Step S1; NO), the process is repeated. If the writing order is inputted (Step S1; YES), the interrupt signal $S_I$ is next outputted to the serial/parallel convertor 79 in order to obtain the address information $S_{ADD}$ corresponding to the record information to be recorded (Step S2). Incidentally, in parallel to the processes at the steps S1 and S2, the DVD-R 1 is rotated by the spindle motor 75. Corresponding to this rotation, the light beam LB is irradiated. Accordingly, the pre-information Sp is obtained from the pre-pit 4 formed on the land track 3 of the DVD-R 1.

When the interrupt signal $S_I$ is outputted at the step S2, it is judged whether or not the address information $S_{ADD}$ inputted by the serial/parallel convertor 79 corresponding to the interrupt signal $S_I$ is a predetermined address information $S_{ADD}$ corresponding to the record information to be recorded (Step S3). If it is not the predetermined address information $S_{ADD}$ (Step S3; NO), the process is returned to the step S2, in order to output the interrupt signal $S_I$ to thereby obtain another address information $S_{ADD}$ again.

On the other hand, if the obtained address information $S_{ADD}$ is the predetermined address information $S_{ADD}$ (Step S3; YES), the preparation signal $S_{RD}$ is outputted (Step S4), in order to make the 8–16 encoder 78 prepare for an output of the record information stream $S_{DS}$, since the predetermined address information $S_{ADD}$ is obtained. Then, the process is ended.

Next, an operation of the 8–16 encoder 78 to which the preparation signal $S_{RD}$ is inputted is explained with reference to FIG. 12B.

Figure 12B:
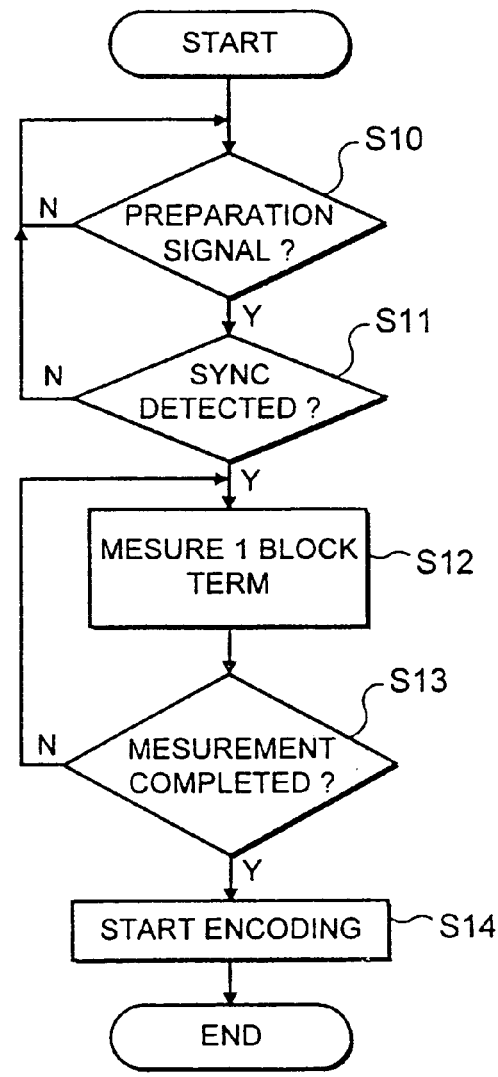
FIG. 12B is a flow chart of showing an operation of an 8–16 encoder of the embodiment.

As shown in FIG. 12B, in the 8–16 encoder 78, it is firstly judged whether or not the preparation signal $S_{RD}$ is inputted from the CPU 80 (Step S10). If it is not inputted (Step S10; N0), the process is repeated until it is inputted. If the preparation signal $S_{RD}$ is inputted (Step S10; YES), it is judged whether or not the synchronization pre-information $S_{SY}$ in the pre-information Sp detected from the synchronization separator 77 is inputted, that is, it is judged whether or not the top portion of the recording sector is detected (Step S11). If it is not detected (Step S11; NO), the process is returned to the step S10 in order to wait until a next preparation signal $S_{RD}$ is inputted. If the synchronization pre-information $S_{SY}$ is detected (Step S11; YES), the time-measurement is performed for one ECC block term (26 recording sector terms) (Step S13). If the measurement is not completed (Step S13; NO), the process waits until it is completed. If it is completed (Step S13; YES), the input signal $S_D$ is 8–16-modulated, and then the gate 78A is opened, and thereby the output of the record information stream $S_{DS}$ is started. Namely, it is started encoding the record signal (Step S14). The output of the record information stream $S_{DS}$ is performed on the basis of the data transferring clock from the PLL circuit 73. Further, in the record information stream $S_{DS}$, the synchronization signal (with a length of 14T) is added to each top portion (the position where the pre-pit 4 in the pre-information is formed) for each synchronization frame. Here, the reason why the time-measurement is performed for one ECC block term at the steps S12 and S13 is that it is intended to surely record the record information from the top portion of the ECC block.

After the record information stream $S_{DS}$ is outputted from the 8–16 encoder 78, the record information stream $S_{DS}$ is pulse-controlled by the pulse controller 81. The drive signal $S_{DR}$ corresponding to the record information stream $S_{DS}$ is outputted by the LD driver 82. The laser diode (not shown) in the pickup 70 is driven by this drive signal $S_{DR}$, and thereby the light beam LB is emitted. The record information pit corresponding to the record information stream $S_{DS}$ is formed on the groove track 2, and thereby the record information is recorded. In a case that the input signal $S_D$ is modulated by the 8–16 modulating method, a length of the record information pit formed on the DVD-R 1 becomes a length from 3T to 14T.

Figure 13:
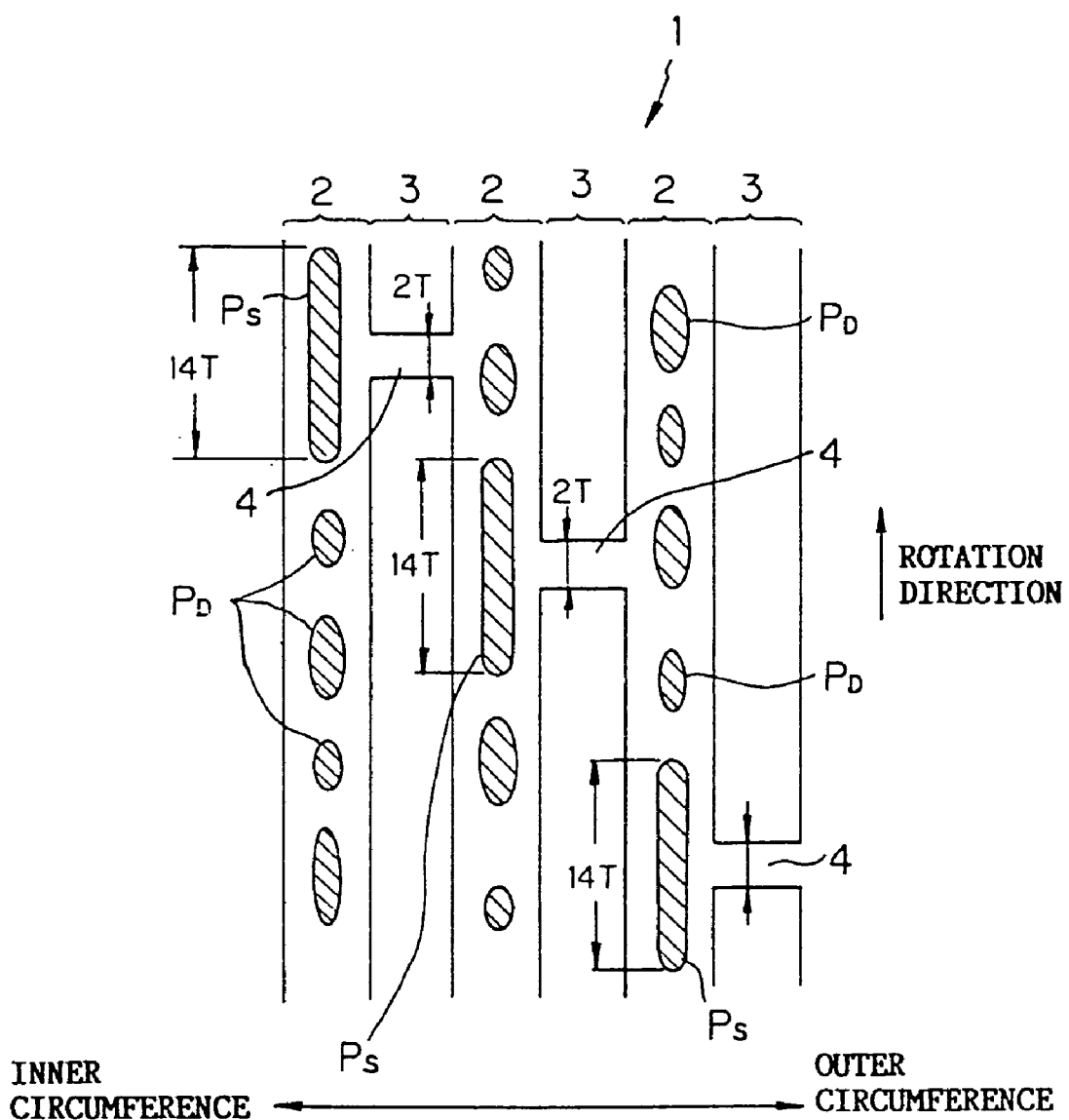
FIG. 13 is a plan view of a record surface of the DVD-R on which the record information is recorded by the embodiment.

Here, the synchronization pre-information in the pre-pit 4 and the synchronization signal in the record information coincide with each other, by the operation (refer to FIG. 12B) in the 8–16 encoder 78. Thus, in one recording sector, the data pre-information on and after the synchronization pre-information (recorded with the length of 2T on the top portion of one synchronization frame, as mentioned above) and the synchronization signal in the record information are in synchronization with each other. That is, seeing this on the DVD-R 1 in which a record information pit $P_D$ corresponding to the record information is formed on the groove track 2, a synchronization signal pit Ps of the record information is always formed adjacent to the pre-pit 4, as shown in FIG. 13. FIG. 13 shows a case of reading out the pre-pit 4 adjacent to an outer circumference side (a right side to a rotation direction) of the groove track 2 while forming the light spot SP (refer to FIG. 1) on the groove track 2 with respect to the rotation direction of the DVD-R 1. Further, a length in the rotation direction of each of the pre-pits 4 is 2T. This length 2T is different from any lengths of the record information pits $P_D$ (3T to 14T) formed by the 8–16 modulation.

As explained above, according to the information recording apparatus R of the embodiment, the record information is recorded such that the synchronization signal is added for each synchronization frame and further the synchronization signal and the pre-information are recorded in synchronization with each other. Thus, the position of the synchronization signal on the groove track 2 and the position of the pre-pit 4 on the land track 3 are adjacent to each other, on the DVD-R 1 on which both the pre-information and the record information are recorded. As a result, at a time of detecting the pre-information or reproducing the record information, it is possible to easily separate and reproduce the record information and the pre-information and also possible to accurately detect the pre-information or reproduce the record information.

Moreover, the length (2T) in the rotation direction of the pre-pit 4 corresponding to the pre-information is different from any lengths of the record information pits $P_D$ (from 3T to 14T) corresponding to the record information. As a result, in reproducing the record information, it is possible to surely separate and reproduce the pre-information to thereby reproduce the record information accurately.

Furthermore, the first 2T term in each pre-information (the synchronization pre-information or the data pre-information) recorded on the top portion of the synchronization frame is set to "L" (refer to FIG. 2) by the operation of the delay flip-flop circuit 47. As a result, even if the position of the pre-pit 4 corresponding to the pre-information and the position of the synchronization signal in the record signal are adjacent to each other, it is possible to detect both of them without a cross talk between both of them.

In the above embodiment, the tangential push-pull method is employed for the detection of the pre-pit 4. Instead, the radial push-pull method may be employed, in which the reflection light from the light spot SP formed on the land track 3 is detected by the two partial detectors divided by a division line optically parallel (i.e. not vertical) to the moving direction of the pre-pit 4, and the pre-information is reproduced on the basis of a differential signal of these detectors. According to the radial push-pull method, it is possible to judge by the polarity of this differential signal on which side the pre-pit 4 is located with respect to the two partial detectors, and, even in a condition that the record information pit $P_D$ is already recorded, the undesirable influence of the record information pit $P_D$ onto the detection of the pre-pit 4 can be reduced.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording record information onto information record medium, said information record medium comprising: an information record track formed on said information record medium, for recording said record information; and pre-information which includes address information indicating a position on said information record medium, recorded on said information record medium as an even pre-information or an odd pre-information in each at least one or more than one record information unit for record information, wherein said even pre-information and said odd pre-information are formed by different patterns on a land track, and said record information including at least one or more than one record information unit recorded on a groove track, said method comprising:
a detecting process of detecting said pre-information recorded on said information record medium;
a generating process of generating said record information which includes a synchronization signal added to each record information unit in correspondence with said detected pre-information; and
a recording process of recording said generated record information including said synchronization signal from predetermined position to said pre-information onto said information record track.

2. A method according to claim 1, wherein
in said recording process, said synchronization signal in said record information is recorded to a position adjacent to said pre-information.

3. A method according to claim 1, wherein
said record information unit is a synchronization frame,
said pre-information is recorded for each pre-information unit doubled said synchronization frame, and
said method further comprises a determining process of determining an address where said record information is to be recorded based on said pre-information.

4. A method according to claim 1, wherein
said pre-information includes synchronization pre-information and data pre-information, and
said synchronization pre-information corresponds to a head portion of a sector including a plurality of said record information units.

5. A method according to claim 1, wherein
said pre-information is recorded to a guide track for guiding a light beam, which records said record information, to said information record track, and
said pre-information is detected by a light beam emitted so that a center thereof is located on a center of said information record track.

6. An information recording apparatus of recording record information onto information record medium, said information record medium comprising: an information record track formed on said information record medium, for recording said record information; and pre-information which includes address information indicating a position on said information record medium, recorded on said information record medium as an even pre-information or an odd pre-information in each of at least one record information unit for record information, wherein said even pre-information and said odd pre-information are formed by different patterns on a land track, and said record information including at least one or more than one record information unit recorded on a groove track, said information record apparatus comprising:
a device which detects said pre-information recorded on said information record medium;
a generating device which generates said record information which includes a synchronization signal added to each record information unit in correspondence with said detected pre-information; and
a recording device which records said generated record information including said synchronization signal from predetermined position to said pre-information onto said information record track.

7. An information recording apparatus according to claim 6, wherein
said recording device records said synchronization signal in said record information to a position adjacent to said pre-information.

8. An information recording apparatus according to claim 6, wherein
said record information unit is a synchronization frame,
said pre-information is recorded for each pre-information unit doubled said one synchronization frame,
said apparatus further comprises a determining device which determines an address where said record information is to be recorded based on said pre-information.

9. An information recording apparatus according to claim 6 wherein
said pre-information includes synchronization pre-information and data pre-information, and
said synchronization pre-information corresponds to a head portion of a sector including a plurality of record information units.

10. information recording apparatus according to claim 6, wherein
said pre-information is recorded to a guide track for guiding a light beam, which records said record information, to said information record track, and
said pre-information is detected by a light beam emitted so that a center thereof is located on a center of said information record track.

11. An information record medium, on which record information is able to be recorded, comprising:
an information record track formed on said information record medium, for recording record information;
and pre-information which includes address information indicating a position on said information record medium, recorded on said information record medium as an even pre-information or an odd pre-information in each at least one synchronization frame for record information,
wherein said even pre-information and said odd pre-information are formed by different patterns on a land track, and said record information including at least one record information unit recorded on a groove track;
said even pre-information is located according to even number synchronization frame in said synchronization frame;
said odd pre-information is located according to odd number synchronization frame in said synchronization frame;
even number synchronization frames and odd number synchronization frames are located alternatively;
one recording sector comprises 26 synchronization frames;
one error correcting code block comprises 16 recording; and
record information including said synchronization signal is recorded from predetermined position to said pre-information.

12. An information record medium according to claim 11, wherein, said even pre-information and said odd pre-information are recorded on offset positions to the information record track.

13. An information record media, according to claim 11, wherein
said record information unit is recorded so that said synchronization signal included in said record information unit adjacent to top position of said pre-information in a radial direction.

14. A method according to claim 1, wherein
said record information unit is recorded so that said synchronization signal included in said record information unit adjacent to top position of said pre-information in a radial direction.

15. An information recording apparatus according to claim 6, wherein said record information unit is recorded so that said synchronization signal included in said record information unit adjacent to top position of said pre-information in a radial direction.

* * * * *